US011337366B2

(12) United States Patent
Schlipf et al.

(10) Patent No.: US 11,337,366 B2
(45) Date of Patent: May 24, 2022

(54) SYSTEMS AND DEVICES FOR CONTROLLING AND MONITORING LIQUID APPLICATIONS OF AGRICULTURAL FIELDS

(71) Applicant: Precision Planting, LLC, Tremont, IL (US)

(72) Inventors: Ben Schlipf, Tremont, IL (US); Brent Wiegand, Mackinaw, IL (US); Justin McMenamy, Edwards, IL (US); Jason Stoller, Eureka, IL (US)

(73) Assignee: Precision Planting LLC, Tremont, IL (US)

( * ) Notice: Subject to any disclaimer, the term of this patent is extended or adjusted under 35 U.S.C. 154(b) by 0 days.

(21) Appl. No.: 16/859,561

(22) Filed: Apr. 27, 2020

(65) Prior Publication Data

US 2020/0253111 A1 Aug. 13, 2020

Related U.S. Application Data

(63) Continuation of application No. 15/763,036, filed as application No. PCT/US2016/052957 on Sep. 21, 2016, now Pat. No. 10,863,667.

(Continued)

(51) Int. Cl.
*A01C 23/00* (2006.01)
*F16K 11/087* (2006.01)
(Continued)

(52) U.S. Cl.
CPC .......... *A01C 23/007* (2013.01); *A01C 21/007* (2013.01); *F16K 5/0605* (2013.01); *F16K 11/0873* (2013.01); *G01F 7/00* (2013.01); *A01C 23/04* (2013.01); *Y10T 137/86751* (2015.04); *Y10T 137/86823* (2015.04)

(58) Field of Classification Search
CPC ..... A01C 23/007; A01C 23/04; A01C 21/007; F16K 11/0873; F16K 11/087; F16K 5/06;
(Continued)

(56) References Cited

U.S. PATENT DOCUMENTS 3,386,461 A ‡ 6/1968 Fisher .................. F16K 5/10
137/23
3,555,901 A ‡ 1/1971 Delatorre et al. ........ G01F 7/00
73/197

(Continued)

FOREIGN PATENT DOCUMENTS

CA        1175256    ‡ 10/1984
CN        2639857    ‡  9/2004
(Continued)

OTHER PUBLICATIONS

Ukrainian Institute of Industrial Property, Examiners Noice of Allowance for related UA Application No. a201804697, dated Feb. 25, 2020.‡

(Continued)

*Primary Examiner* — David Colon-Morales

(57) ABSTRACT

Described herein are systems and devices for controlling and monitoring liquid applications of agricultural fields. In one embodiment, a flow device for controlling flow during an agricultural operation includes an offset ball valve having multiple openings that rotate in position to control flow of a liquid through the offset ball valve to an outlet passage. The flow device also includes a first passage that provides a first flow path from an inlet to at least one opening of the offset ball valve and second passage that provides a second flow path from the inlet to at least one opening of the offset ball valve.

7 Claims, 17 Drawing Sheets

Related U.S. Application Data

(60) Provisional application No. 62/298,914, filed on Feb. 23, 2016, provisional application No. 62/279,577, filed on Jan. 15, 2016, provisional application No. 62/262,861, filed on Dec. 3, 2015, provisional application No. 62/233,926, filed on Sep. 28, 2015.

(51) Int. Cl.
| | | |
|---|---|---|
| *G01F 7/00* | (2006.01) | |
| *F16K 5/06* | (2006.01) | |
| *A01C 21/00* | (2006.01) | |
| *A01C 23/04* | (2006.01) | |

(58) Field of Classification Search
CPC . F16K 5/0605; F16K 5/10; F16K 5/12; F16K 27/067; Y10T 137/86823; Y10T 137/87265; Y10T 137/8733; Y10T 137/87523; Y10T 137/86743; Y10T 137/86751; G01F 7/00
See application file for complete search history.

(56) References Cited

U.S. PATENT DOCUMENTS

| | | | | |
|---|---|---|---|---|
| 3,949,965 A ‡ | 4/1976 | Sharples | ............ | F16K 11/0873 |
| | | | | 251/171 |
| 4,467,961 A ‡ | 8/1984 | Coffee | ............... | A01M 7/0089 |
| | | | | 239/1 |
| 4,610,162 A ‡ | 9/1986 | Okabayashi | ............. | G01F 1/20 |
| | | | | 73/197 |
| 4,653,321 A ‡ | 3/1987 | Cunningham | ........ | G01F 1/6842 |
| | | | | 340/606 |
| 4,946,079 A ‡ | 8/1990 | Campbell | ............. | B67D 3/048 |
| | | | | 222/484 |
| 4,964,436 A ‡ | 10/1990 | Hein | ..................... | F16K 5/0636 |
| | | | | 137/625.47 |
| 5,033,397 A * | 7/1991 | Colburn, Jr. | ........ | A01M 7/0089 |
| | | | | 111/118 |
| 5,070,909 A ‡ | 12/1991 | Davenport | ........... | F16K 5/0605 |
| | | | | 137/625.32 |
| 5,117,856 A ‡ | 6/1992 | Kim | ......................... | G01F 7/00 |
| | | | | 137/11 |
| 5,297,427 A ‡ | 3/1994 | Shambayati | ............ | G01F 5/005 |
| | | | | 73/203 |
| 5,311,904 A ‡ | 5/1994 | Beppu | ................... | F16K 5/0605 |
| | | | | 137/269 |
| 5,324,008 A ‡ | 6/1994 | Bonetti | ................. | F16K 5/0605 |
| | | | | 251/315.16 |
| 5,524,863 A ‡ | 6/1996 | Davis | ....................... | B08B 9/00 |
| | | | | 137/625.32 |
| 5,576,486 A ‡ | 11/1996 | Paz | ........................ | F16K 31/084 |
| | | | | 137/519.5 |
| 5,771,929 A * | 6/1998 | Boger | ................... | F16K 5/0605 |
| | | | | 137/625.32 |
| 5,931,882 A * | 8/1999 | Fick | ...................... | A01B 79/005 |
| | | | | 701/50 |
| 5,944,055 A ‡ | 8/1999 | Dicky | .................. | F16K 11/0873 |
| | | | | 137/62 |
| 5,967,066 A ‡ | 10/1999 | Giles | .................... | A01C 23/024 |
| | | | | 111/11 |
| 6,065,492 A ‡ | 5/2000 | Bergamini | ................ | G01F 1/40 |
| | | | | 137/487 |
| 6,070,539 A ‡ | 6/2000 | Flamme | ............... | A01C 21/005 |
| | | | | 111/17 |
| 6,138,590 A * | 10/2000 | Colburn, Jr. | ......... | A01B 79/005 |
| | | | | 111/118 |
| 6,302,373 B1 ‡ | 10/2001 | Lee | ....................... | F16K 5/0636 |
| | | | | 137/55 |
| 6,779,779 B2 ‡ | 8/2004 | Lemmonier | ............... | F16K 5/12 |
| | | | | 251/207 |
| 7,063,276 B2 ‡ | 6/2006 | Newton | ................... | A01C 23/04 |
| | | | | 239/146 |
| 7,178,782 B1 * | 2/2007 | York | ......................... | F16K 5/12 |
| | | | | 137/625.3 |
| 7,261,245 B2 ‡ | 8/2007 | Zur | ...................... | A01G 25/167 |
| | | | | 137/78.3 |
| 8,191,798 B2 * | 6/2012 | Hahn | ................... | A01C 23/007 |
| | | | | 239/157 |
| 8,365,766 B2 ‡ | 2/2013 | Wang | .................... | F16K 5/0605 |
| | | | | 137/556.6 |
| 8,997,667 B2 ‡ | 4/2015 | Blunier | ................ | A01C 23/007 |
| | | | | 111/118 |
| 9,060,473 B2 ‡ | 6/2015 | Lindores | .............. | A01G 25/092 |
| 9,113,591 B2 * | 8/2015 | Shivak | .................... | A01C 7/082 |
| 9,380,773 B2 ‡ | 7/2016 | Hebbert | ................ | A01M 7/0092 |
| 9,574,923 B2 ‡ | 2/2017 | Williamson | .............. | G01F 1/06 |
| 9,933,089 B2 ‡ | 4/2018 | Bey | ......................... | F16K 47/08 |
| 10,863,667 B2 * | 12/2020 | Schlipf | ................. | F16K 5/0605 |
| 2004/0244833 A1 ‡ | 12/2004 | Buhler | ................. | A01G 25/167 |
| | | | | 137/78.2 |
| 2007/0068584 A1 ‡ | 3/2007 | Murdock | .............. | F16K 5/0605 |
| | | | | 137/625.47 |
| 2009/0032762 A1 ‡ | 2/2009 | Junier | ................... | F16K 5/0605 |
| | | | | 251/315.16 |
| 2010/0089471 A1 ‡ | 4/2010 | Zakay | ........................ | G01F 7/00 |
| | | | | 137/528 |
| 2013/0126769 A1 ‡ | 5/2013 | Weir | ....................... | E21B 21/12 |
| | | | | 251/31 |
| 2013/0144827 A1 * | 6/2013 | Trevino | ................... | A01C 7/06 |
| | | | | 706/46 |
| 2014/0060405 A1 ‡ | 3/2014 | Blunier | ................ | A01C 23/007 |
| | | | | 111/12 |
| 2014/0214284 A1 ‡ | 7/2014 | Sauder | .................... | A01C 7/205 |
| | | | | 701/50 |
| 2014/0263708 A1 * | 9/2014 | Thompson | .......... | A01C 23/007 |
| | | | | 239/11 |
| 2015/0039179 A1 ‡ | 2/2015 | Boothe | ................ | A01C 23/007 |
| | | | | 701/34.4 |
| 2018/0143052 A1 ‡ | 5/2018 | Xie | ....................... | E21B 49/087 |
| 2018/0368310 A1 ‡ | 12/2018 | Zimmerman | ........ | A01C 23/002 |
| 2019/0136990 A1 ‡ | 5/2019 | Johansson | ........... | F16K 11/0873 |

FOREIGN PATENT DOCUMENTS

| | | | | | |
|---|---|---|---|---|---|
| CN | 2639858 | ‡ | 9/2004 | | |
| CN | 202002684 | ‡ | 10/2011 | | |
| CN | 102252724 B | ‡ | 11/2011 | | |
| CN | 202158880 | ‡ | 3/2012 | | |
| CN | 203163789 | ‡ | 8/2013 | | |
| CN | 103868559 | ‡ | 6/2014 | | |
| CN | 203672425 | ‡ | 6/2014 | | |
| CN | 203869740 | ‡ | 10/2014 | | |
| CN | 204027618 | ‡ | 12/2014 | | |
| CN | 108289410 A | ‡ | 7/2018 | ............ | G01F 7/00 |
| DE | 2929480 A1 | ‡ | 2/1981 | ......... | F16K 11/0873 |
| EP | AO-3355675 | ‡ | 8/2018 | | |
| GB | 1303870 | ‡ | 5/1970 | | |
| GB | 2352020 A | ‡ | 1/2001 | ......... | F16K 11/0856 |
| JP | 56004015 | ‡ | 6/1979 | | |
| JP | 58027020 | ‡ | 2/1983 | | |
| JP | 61128124 | ‡ | 11/1984 | | |
| JP | 06094502 | ‡ | 9/1992 | | |
| JP | 10221150 | ‡ | 2/1997 | | |
| JP | 2001208578 | ‡ | 8/2001 | | |
| UA | 67810 U | ‡ | 3/2012 | | |
| WO | WO-8103700 A1 | ‡ | 12/1981 | ............ | G01F 7/00 |
| WO | WO-97/12688 A1 | ‡ | 4/1997 | ......... | B05B 12/085 |
| WO | WO-0014487 A1 | ‡ | 3/2000 | ............ | G01F 1/065 |
| WO | WO-2017058616 A1 | ‡ | 4/2017 | | |

OTHER PUBLICATIONS

FT-110 Series Turbine Flow Sensor, downloaded from https://www.gemssensors.com/flow/electronic-flow-sensors/ turbo-flow/ft-110-series-flow-sensor on Sep. 20, 2018/, 2 pages.‡

Regulating Valves, downloaded from http://teejetguidance.com/english/home/products/application-control-and- equipment/control-valves/regulating-valves.aspx on Sep. 20, 2018, 4 pages.‡

(56) References Cited

OTHER PUBLICATIONS

International Search Report and Written Opinion received for International Application No. PCT/US2016/052957 (P008PCT), dated Jan. 27, 2017, 16 pages.‡

* cited by examiner
‡ imported from a related application

SYSTEMS AND DEVICES FOR CONTROLLING AND MONITORING LIQUID APPLICATIONS OF AGRICULTURAL FIELDS

CROSS REFERENCE TO RELATED APPLICATIONS

This application is a continuation application of U.S. Ser. No. 15/763,036, filed on 23 Mar. 2018, which is a national stage entry of PCT Application No. PCT/2016/052957, filed on 21 Sep. 2016, which claims priority to U.S. Provisional Application No. 62/233,926, filed on Sep. 28, 2015, U.S. Provisional Application No. 62/262,861, filed on Dec. 3, 2015, and U.S. Provisional Application No. 62/298,914, filed on Feb. 23, 2016, the entire contents of which are hereby incorporated by reference.

TECHNICAL FIELD

Embodiments of the present disclosure relate to systems and devices for controlling and monitoring liquid applications of agricultural fields.

BACKGROUND

Planters are used for planting seeds of crops (e.g., corn, soybeans) in a field. Planters may also be used for applying a liquid application (e.g., fertilizers, chemicals) to the soil or crops. Applying the liquid application with different row units of a planter can be challenging in terms of controlling this application for the different row units.

SUMMARY

Described herein are systems and devices for controlling and monitoring liquid applications of agricultural fields. In one embodiment, a flow device for controlling flow during an agricultural operation includes an offset ball valve having multiple openings that rotate in position to control flow of a liquid through the offset ball valve to an outlet passage. The flow device also includes a first passage that provides a first flow path from an inlet to at least one opening of the offset ball valve and second passage that provides a second flow path from the inlet to at least one opening of the offset ball valve.

In another embodiment, a control and monitoring unit includes a valve having an opening for controlling flow of a liquid through the valve to an outlet. The control and monitoring unit also includes first passage that provides a first flow path having a variable first flow rate from an inlet to the valve. The first passage includes a first flow meter to monitor flow of the liquid through the first passage. A second passage provides a second flow path having a variable second flow rate from the inlet to the valve. The second passage includes a second flow meter to monitor flow of the liquid through the second passage.

BRIEF DESCRIPTION OF THE DRAWINGS

The present disclosure is illustrated by way of example, and not by way of limitation, in the figures of the accompanying drawings and in which.

DETAILED DESCRIPTION

Described herein are systems and devices for controlling and monitoring liquid applications of agricultural fields. In one embodiment, an implement includes multiple row units with flow devices (e.g., control and monitoring units) for liquid applications. A control and monitoring pump controls a flow of liquid from a storage tank to each of the flow devices. In one example, a control and monitoring unit (CMU) includes a valve (e.g., ball valve, offset ball valve) having an opening for controlling flow of a liquid through the valve to an outlet. A first passage of the CMU provides a first flow path having a first flow rate from an inlet to the valve. The first passage includes a first flow meter to monitor flow of the liquid through the first passage. A second passage of the CMU provides a second flow path having a second flow rate from the inlet to the valve. The second passage includes a second flow meter to monitor flow of the liquid through the second passage.

The control and monitoring pump can control all CMUs of the implement or a group of CMUs. The control and monitoring pump and the CMUs have a wide operating range of flow rates (e.g., up to 60×) in contrast to conventional pumps and flow devices. Each CMU can include dual passages having different operating ranges of flow rates in order to provide a linear response for sensing flow rates across an entire operating range of flow rates.

In the following description, numerous details are set forth. It will be apparent, however, to one skilled in the art, that embodiments of the present disclosure may be practiced without these specific details. In some instances, well-known structures and devices are shown in block diagram form, rather than in detail, in order to avoid obscuring the present disclosure.

Figure 1:
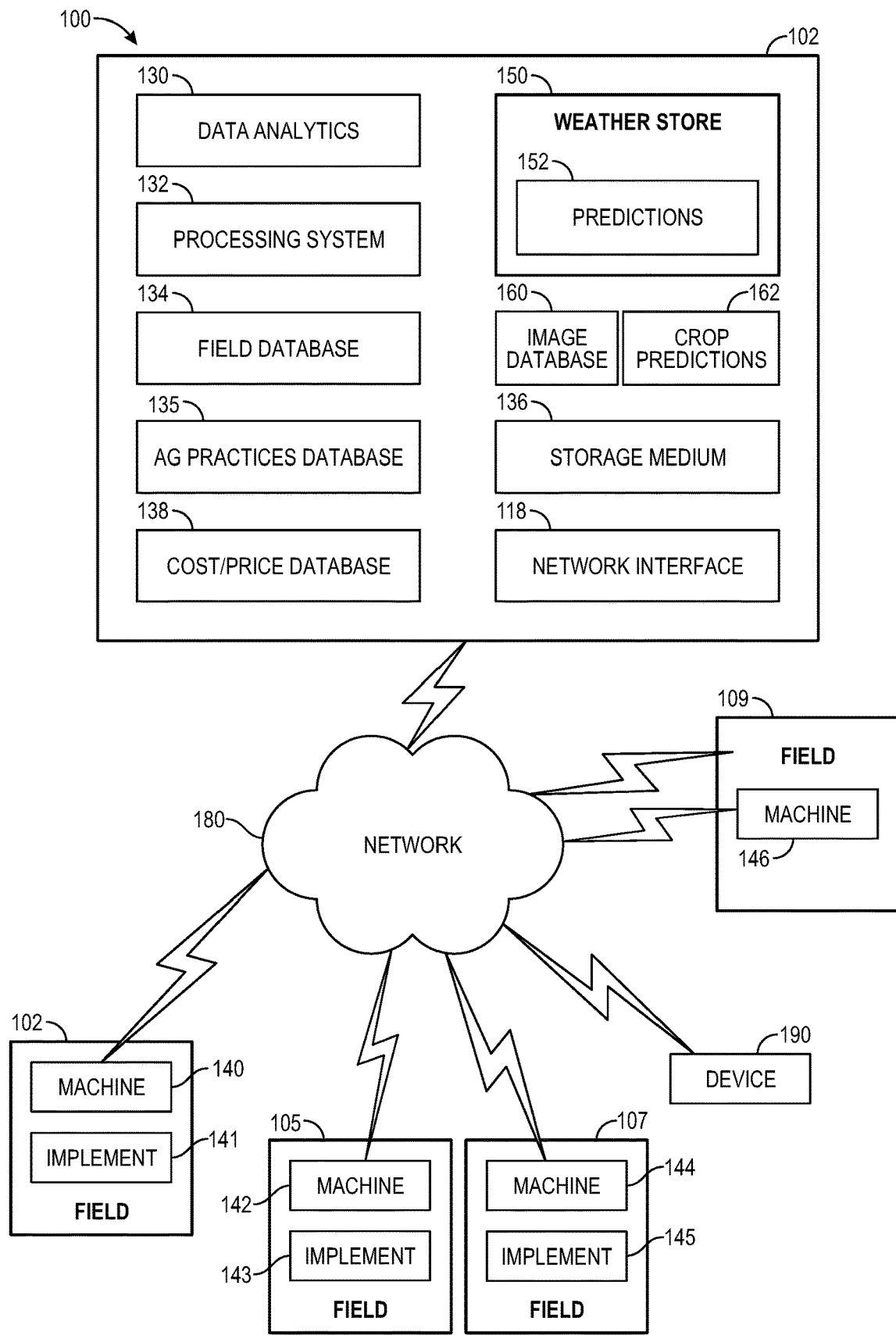
FIG. 1 shows an example of a system for performing agricultural operations of agricultural fields including operations of an implement in accordance with one embodiment.

FIG. 1 shows an example of a system for performing agricultural operations of agricultural fields including operations of an implement in accordance with one embodiment. For example and in one embodiment, the system 100 may be implemented as a cloud based system with servers, data processing devices, computers, etc. Aspects, features, and functionality of the system 100 can be implemented in servers, planters, planter monitors, combines, laptops, tablets, computer terminals, client devices, user devices, handheld computers, personal digital assistants, cellular telephones, cameras, smart phones, mobile phones, computing devices, or a combination of any of these or other data processing devices.

In other embodiments, the system includes a network computer or an embedded processing device within another device (e.g., display device) or within a machine (e.g., planter, combine), or other types of data processing systems having fewer components or perhaps more components than that shown in FIG. 1.

The system 100 (e.g., cloud based system) and agricultural operations can control and monitor liquid applications using an implement or machine. The system 100 includes machines 140, 142, 144, 146 and implements 141, 143, 145 coupled to a respective machine. The implements (or machines) can include flow devices for controlling and monitoring liquid applications (e.g., spraying, fertilization) of crops and soil within associated fields (e.g., fields 102, 105, 107, 109). The system 100 includes an agricultural analysis system 102 that includes a weather store 150 with current and historical weather data, weather predictions module 152 with weather predictions for different regions, and at least one processing system 132 for executing instructions for controlling and monitoring different operations (e.g., liquid applications). The storage medium 136 may store instructions, software, software programs, etc for execution by the processing system and for performing operations of the agricultural analysis system 102. An image database 160 stores captured images of crops at different growth stages. A data analytics module 130 may perform analytics on agricultural data (e.g., images, weather, field, yield, etc.) to generate crop predictions 162 relating to agricultural operations.

A field information database 134 stores agricultural data (e.g., crop growth stage, soil types, soil characteristics, moisture holding capacity, etc.) for the fields that are being monitored by the system 100. An agricultural practices information database 135 stores farm practices information (e.g., as-applied planting information, as-applied spraying information, as-applied fertilization information, planting population, applied nutrients (e.g., nitrogen), yield levels, proprietary indices (e.g., ratio of seed population to a soil parameter), etc.) for the fields that are being monitored by the system 100. An implement can obtain liquid application data from the CMUs and provide this data to the system 100. A cost/price database 138 stores input cost information (e.g., cost of seed, cost of nutrients (e.g., nitrogen)) and commodity price information (e.g., revenue from crop).

The system 100 shown in FIG. 1 may include a network interface 118 for communicating with other systems or devices such as drone devices, user devices, and machines (e.g., planters, combines) via a network 180 (e.g., Internet, wide area network, WiMax, satellite, cellular, IP network, etc.). The network interface include one or more types of transceivers for communicating via the network 180.

The processing system 132 may include one or more microprocessors, processors, a system on a chip (integrated circuit), or one or more microcontrollers. The processing system includes processing logic for executing software instructions of one or more programs. The system 100 includes the storage medium 136 for storing data and programs for execution by the processing system. The storage medium 136 can store, for example, software components such as a software application for controlling and monitoring liquid applications or any other software application. The storage medium 136 can be any known form of a machine readable non-transitory storage medium, such as semiconductor memory (e.g., flash; SRAM; DRAM; etc.) or non-volatile memory, such as hard disks or solid-state drive.

While the storage medium (e.g., machine-accessible non-transitory medium) is shown in an exemplary embodiment to be a single medium, the term "machine-accessible non-transitory medium" should be taken to include a single medium or multiple media (e.g., a centralized or distributed database, and/or associated caches and servers) that store the one or more sets of instructions. The term "machine-accessible non-transitory medium" shall also be taken to include any medium that is capable of storing, encoding or carrying a set of instructions for execution by the machine and that cause the machine to perform any one or more of the methodologies of the present disclosure. The term "machine-accessible non-transitory medium" shall accordingly be taken to include, but not be limited to, solid-state memories, optical and magnetic media, and carrier wave signals.

Figure 2:
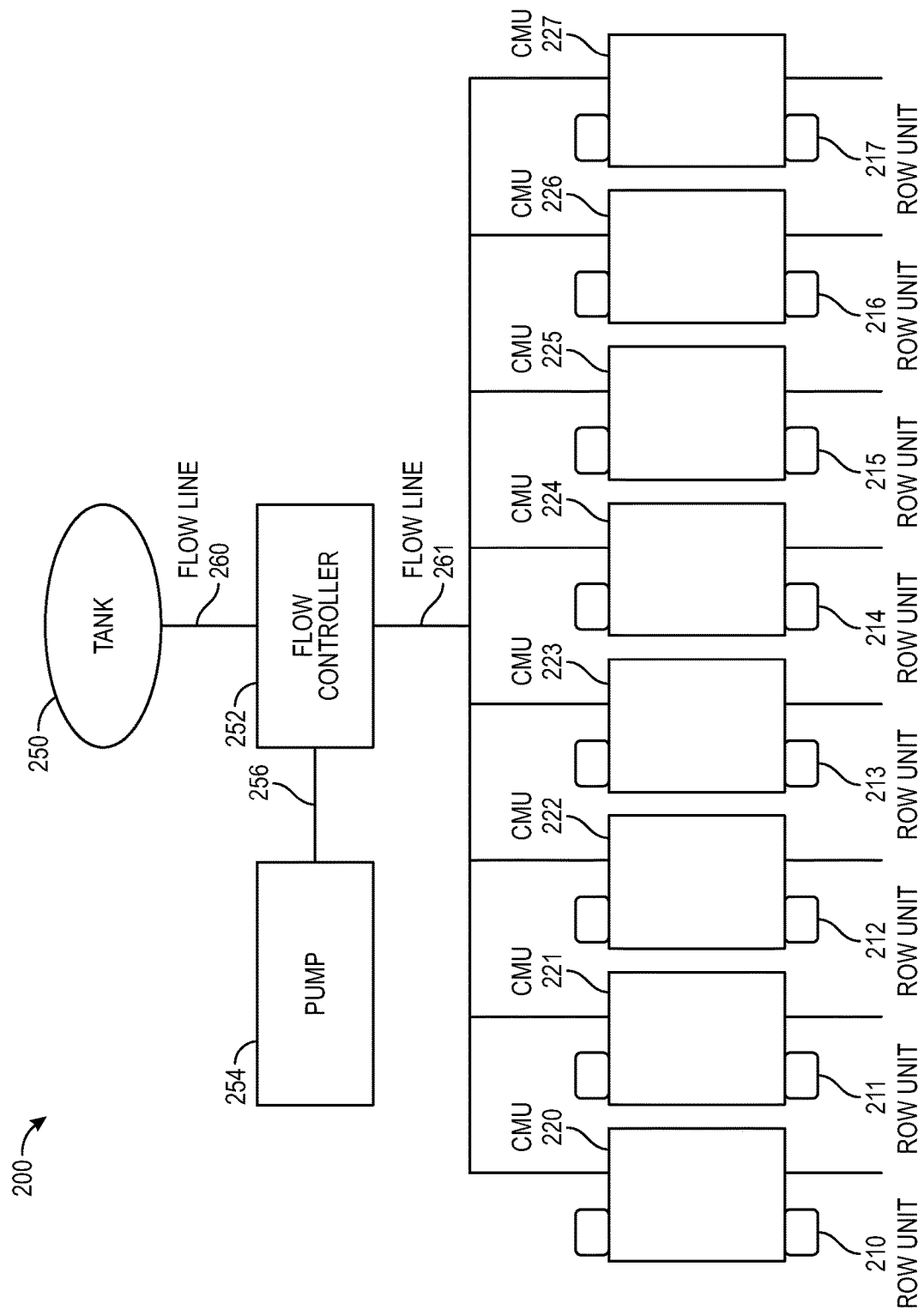
FIG. 2 illustrates an architecture of an implement 200 for controlling and monitoring applications (e.g., liquid applications, fluid mixture applications)

FIG. 2 illustrates an architecture of an implement 200 for controlling and monitoring applications (e.g., liquid applications, fluid mixture applications) in one embodiment. The implement 200 includes at least one storage tank 250, flow lines 260 and 261, a flow controller 252 (e.g., valve), and at least one variable-rate pump 254 (e.g., electric, centrifugal, piston, etc.) for pumping and controlling application rate of a liquid (e.g., liquid application, semiliquid mixture) from the at least one storage tank to different control and monitoring units (CMUs) 220-227 (e.g., flow devices 220-227) of row units 210-217, respectively of the implement. In one example, each row unit includes a CMU for controlling and monitoring a liquid (e.g., flow rate of a liquid) applied to soil or crops of a field.

In one example, the variable-rate pump 254 controls pumping of a liquid from the storage tank 250 to each of the CMUs. In another example, the implement 200 includes multiple storage tanks. The pump 254 controls pumping of a first liquid (e.g., first type of fertilizer) from the storage tank 250 to each of the CMUs and controls pumping of a second liquid (e.g., second type of fertilizer) from an additional storage tank 250 to each of the CMUs.

In another example, the implement 200 includes multiple control pumps. Each control pump includes a section or group of row units. A first control pump may control CMUs 220-223 while a second control pump controls CMUs 224-227. The control pump may have a flow rate range of 0.5 to 30 gallons per minute (gpm) while a CMU may have a flow rate range of 0.05 to 3 gpm.

In another example, a pump includes an external flow control and external sensors. Each CMU (e.g., flow device) includes row by row sensing, monitoring, and mapping functionality. Liquid application data can be used for generating user interfaces that show a field map of liquid application. For example, a first region of a field may have an application of 100 units of nitrogen and a second region of a field has an application of 50 units of nitrogen. These data can be compared or overlaid with other data such as yield data. Each CMU may also provide row by row control functionality for swath control if desired to turn off liquid application for region(s), turn compensation for compensation of flow rate during a turn of the implement, and variable rate for liquid application such that each row unit can set its flow rate independent of other row units. The valve and dual passages eliminate orifices of the flow device (e.g., CMU).

Figure 3:
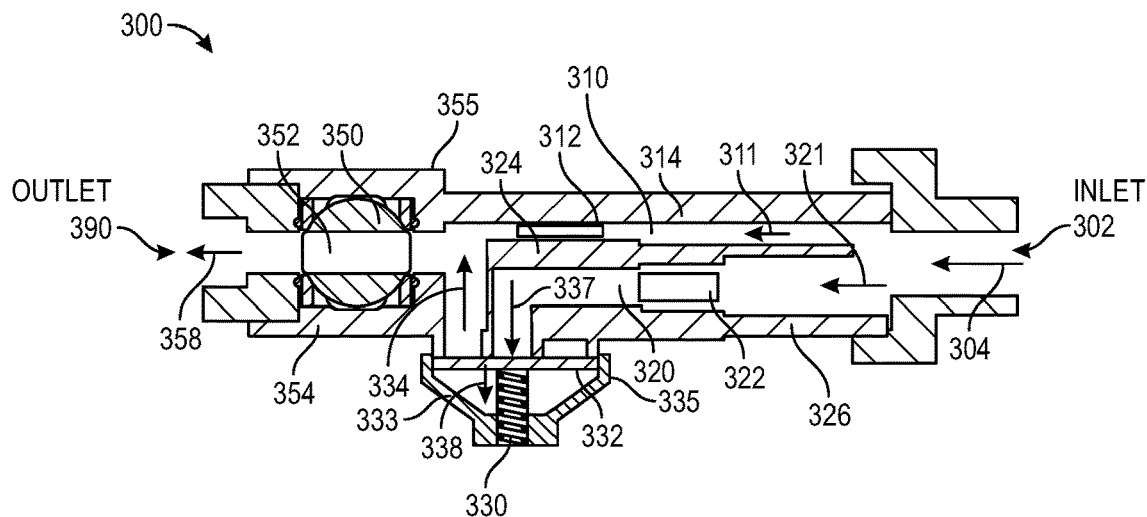
FIG. 3 illustrates a flow device (e.g., control and monitoring unit) for controlling and monitoring applications in a field in accordance with one embodiment.

FIG. 3 illustrates a flow device (e.g., control and monitoring unit) for controlling and monitoring applications in a field in accordance with one embodiment. The flow device (e.g., control and monitoring unit (CMU) 300) includes an inlet 302 for receiving a liquid (e.g., liquid application, semiliquid mixture, fertilizer application, chemical application) that flows in directions 304, 311, 321, and 334 into the inlet and then further into a first passage 310 and a second passage 320. The passage 310 is defined by a sidewall 314 and a sidewall 324. The passage 310 (e.g., low flow passage) includes a flow meter 312 (e.g., turbine style, Hall Effect turbine flow meter, FT-110 Series—TurboFlow® turbine flow meter available from Gems Sensors & Controls in Plainville, Conn.) that is designed to measure a rate of flow through the flow meter. The passage 320 (e.g., high flow passage) also includes a flow meter 322 (e.g., turbine style) that is designed to measure a rate of flow through this flow meter. The sidewalls 324 and 326 are coupled to a moveable member 332, which is coupled to a spring 330 and members 333 and 335. A ball valve 350 is positioned between members 354 and 355. The ball valve can be rotated or moved such that an opening 352 is positioned in an opened position as illustrated in FIG. 3 for permitting a flow of liquid or in a closed positioned (e.g., opening rotates 90 degrees, opening aligned vertically).

Figure 4:
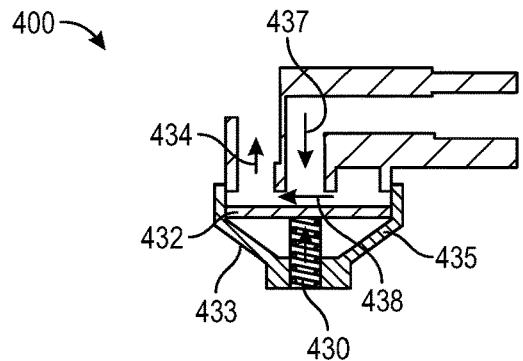
FIG. 4 illustrates a spring 430 in an open position of a flow device in accordance with one embodiment.

In one flow example, a liquid (or fluid) enters an inlet 302 and then flows into the passages 310 and 320. The liquid in the passage 310 flows through the flow meter 312 and then flows through the opening 352 when the ball valve has an opened position as illustrated in FIG. 3. The liquid then flows through the outlet 390 with a direction 358. The liquid that flows into passage 320 flows through the flow meter 322 and then flows to the member 332 in direction 337. The spring 330 opens (e.g., compresses) when pressure on a first surface (e.g., upper surface) of the member 332 exceeds pressure on a second surface (e.g., lower surface) of the member 332. The member 332 moves in a direction 338 when the spring is in an open position as illustrated in FIG. 4 in accordance with one embodiment. The member 332 is supported by the members 333 and 335 and the spring 330. The liquid flows past the member 332 in a direction 334 when the spring 330 opens and the member 332 is forced into an open position. The liquid then flows through the opening 352 in a direction 358 towards outlet 390.

FIG. 4 illustrates a spring 430 in an open position in accordance with one embodiment. The member 432 (e.g., member 332, member 532) has moved downwards causing the spring 430 (e.g., spring 330, spring 530) to compress. A liquid flows as indicated by arrows 437, 438, and 434. The member 432 may be rigid or flexible. The member 432 if flexible may move or shift non-uniformly or bend to create a flow path for the liquid.

Figure 5:
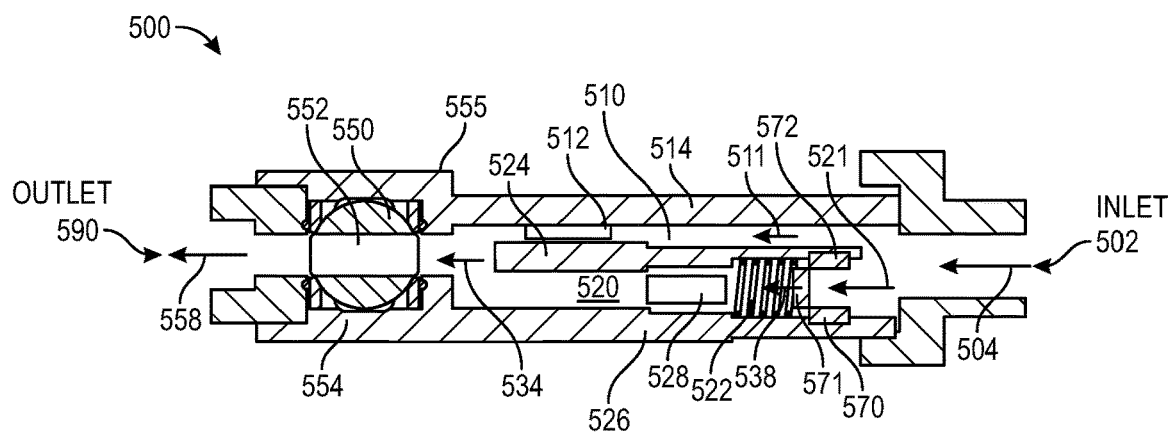
FIG. 5 illustrates a flow device (e.g., control and monitoring unit) for controlling and monitoring applications in a field in accordance with one embodiment.

FIG. 5 illustrates a flow device (e.g., control and monitoring unit) for controlling and monitoring applications in a field in accordance with one embodiment. The flow device (e.g., control and monitoring unit (CMU) 500) includes an inlet 502 for receiving a liquid (e.g., liquid application, semiliquid mixture, fertilizer application, chemical application) that flows in directions 504, 511, 521, and 534 into the inlet 502 and then further into a first passage 510 and a second passage 520. The passage 510 (e.g., low flow passage) is defined by a sidewall 514 and a sidewall 524. The passage 510 includes a flow meter 512 (e.g., turbine style) that is designed to measure a rate of flow through the flow meter. The passage 520 (e.g., high flow passage) also includes a spring 522, members 570-572, and a flow meter 528 (e.g., turbine style) that is designed to measure a rate of flow through this flow meter. The member 570 is coupled to sidewall 526 while the member 572 is coupled to sidewall 524. A moveable member 571 is coupled to a spring 522. A ball valve 550 is positioned between members 554 and 555. The ball valve can be rotated or moved such that an opening 552 within the ball valve is positioned in an opened position as illustrated in FIG. 5 for permitting a flow of liquid or in a closed positioned (e.g., opening rotates 90 degrees, opening aligned vertically).

The flow meter 528 may be disposed to intercept all flow through the second passage 520. In other embodiments, the flow meter 528 may be disposed to intercept only a part of the flow (e.g., disposed offset from the walls of the passage 520 and/or having an outer radius smaller than an outer radius of the passage 520) such that a portion of fluid is permitted to flow past the flow meter 528 without passing through (and/or being measured by) the flow meter 528. In such embodiments the signal generated by the flow meter 528 is preferably converted to an estimated actual flow value by referencing an empirical database.

The relative size of the passages (e.g., 510, 512), the position and size of the flow meters (e.g., 512, 528) relative to their associated passages, and the flow rate and/or pressure required for flow through either passage (e.g., the flow rate, pressure and/or flow required to overcome the force of spring 522), are preferably selected such that the minimum and maximum flow rates through each of the flow meters (e.g., 512, 528) are within desired ranges that are preferably within the accurately measurable (e.g., within 0.01%, 0.1%, 1%, 2% or 5%) range of flow rates for each. Put otherwise, at each total flow rate through the CMU 500, the division of flow is preferably balanced (e.g., proportionally divided, shared) between the two passages such that the flow rate through the first flow meter 512 is within a first desired range (e.g., accurately measurable range) associated with the first flow meter and the flow rate through the second flow meter 528 is within a second desired range (e.g., accurately measurable range) associated with the second flow meter.

In one flow example, a liquid enters an inlet 502 and then flows into the passages 510 and 520. The liquid in the passage 510 flows through the flow meter 512 and then flows through the opening 552 when the ball valve has an opened position as illustrated in FIG. 5. The liquid then flows through the outlet 590 with a direction 558. The liquid that flows into passage 520 flows into a member 571 that is coupled to the spring 522, which opens (e.g., compresses) when pressure on a first side of the member 571 that is opposite of the spring exceeds pressure on a second side of the member 571 that is adjacent or in contact with the spring 522. The member 571 moves in a direction 538 towards the spring (away from members 570 and 572) to cause the spring to compress in an open position. When the spring is in an open position, the liquid flows past the member 571 in a direction 538 and then through the flow meter 528. The liquid then flows in a direction 534 through the opening 552 in a direction 558 towards outlet 590. The spring 522 provides a functionality in keeping a flow path through passage 520 closed until a flow rate has reached a certain range such that measurements of the flow meter 528 are accurate.

Figure 6:
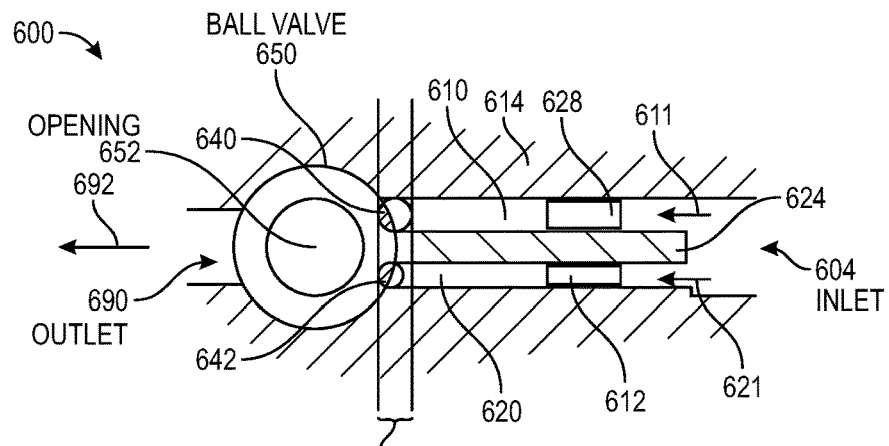
FIG. 6 illustrates a flow device (e.g., control and monitoring unit) for controlling and monitoring applications in a field in accordance with one embodiment.

FIG. 6 illustrates a flow device (e.g., control and monitoring unit) for controlling and monitoring applications in a field in accordance with one embodiment. The flow device (e.g., control and monitoring unit (CMU) 600) includes an inlet 602 for receiving a liquid (e.g., liquid application, semiliquid mixture, fertilizer application, chemical application) that flows into the inlet 602 and then further into a first passage 610 in direction 611 and a second passage 620 in a direction 621. The passage 610 (e.g., high flow passage) is defined by a sidewall 614 and a sidewall 624. The passage 610 includes a flow meter 628 (e.g., turbine style) that is designed to measure a rate of flow through the flow meter. The passage 620 (e.g., low flow passage) also includes a flow meter 612 (e.g., turbine style) that is designed to measure a rate of flow through this flow meter. A ball valve 650 can be rotated or moved such that an opening 652 within the ball valve is positioned in an opened position as illustrated in FIG. 6 for permitting a flow of liquid or in a closed positioned for no flow of the liquid.

In one flow example, a liquid enters an inlet 604 and then flows into the passages 610 and 620. The liquid in the passage 610 flows through the flow meter 628 and then flows through a cross-sectional opening 640 into the opening 652 when the ball valve has an opened position as illustrated in FIG. 6. The liquid then flows through an outlet 690 with a direction 692. The liquid that flows into the passage 620 flows through the flow meter 612. The liquid then flows through a cross-sectional opening 642 into the opening 652 in a direction 692 through outlet 690. The cross-sectional openings 640 and 642 of region 641 are uniquely designed such that a low flow path through passage 620 opens slowly as the ball valve 650 initially begins to rotate from a closed positioned into a partially opened position and then subsequently a high flow path through passage 610 starts to open as the ball valve continue to rotate and open further as illustrated in FIG. 6. In this example, the cross-sectional opening 642 of the low flow path has a smaller area in comparison to the cross-sectional opening 640 of the high flow path.

Figure 7:
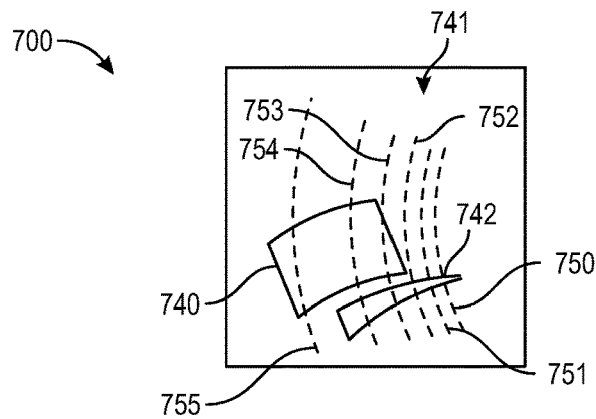
FIG. 7 illustrates an exploded view 741 of a region 641 having cross-sectional openings between passages and a ball valve in accordance with one embodiment.

FIG. 7 illustrates an exploded view 741 of a region 641 having cross-sectional openings between passages and a ball valve in accordance with one embodiment. The cross-sectional openings 740 and 742 correspond to cross-sectional openings 640 and 642, respectively of FIG. 6. Dimensions of the cross-sectional openings 740 and 742 vary as a ball valve rotates or moves causing an increase in available cross-sectional area of an opening (e.g., opening 652) through the ball valve.

In one example, a ball valve rotates or moves from a closed position as illustrated with a dashed line 750 to a partially open (e.g., dashed lines 751-754) or fully open position as illustrated with dashed line 755. A low flow path through a passage (e.g., passage 620) opens slowly as the ball valve 650 initially begins to rotate from a closed positioned of dashed line 750 into partially opened positions of dashed lines 751-752. It should be appreciated that the dashed lines of FIG. 7 represent an edge of the opening 652, where the opening is to the right of the dashed line. A high flow path is not flowing during these positions as illustrated by the dashed lines 750-752 not intersecting with the opening 740. Subsequently, a high flow path through a passage (e.g., passage 610) starts to open as the ball valve continue to rotate and opens further as illustrated in FIG. 7 with the dashed lines 753-755 intersecting with the cross-sectional opening 740. In this example, the cross-sectional opening 742 of the low flow path has a smaller area in comparison to the cross-sectional opening 740 of the high flow path.

The opening 742 preferably has a gradually widening (e.g., generally triangular) shape and is preferably generally narrower than the opening 740; thus a relatively wide range of motion of the ball valve corresponds to a gradually increasing rate of flow in the low flow range in which flow is only allowed through the low flow passage. The opening 740 is preferably generally wider than the opening 742 and preferably of generally constant width (e.g., generally trapezoidal in shape); as a result, a relatively small range of motion of the ball valve is thus required to introduce a relatively high flow to the high flow passage, which result may be preferable in embodiments in which the flow meter 528 associated with the high flow passage does not operate accurately or at all at relatively low flow rates.

Figure 8:
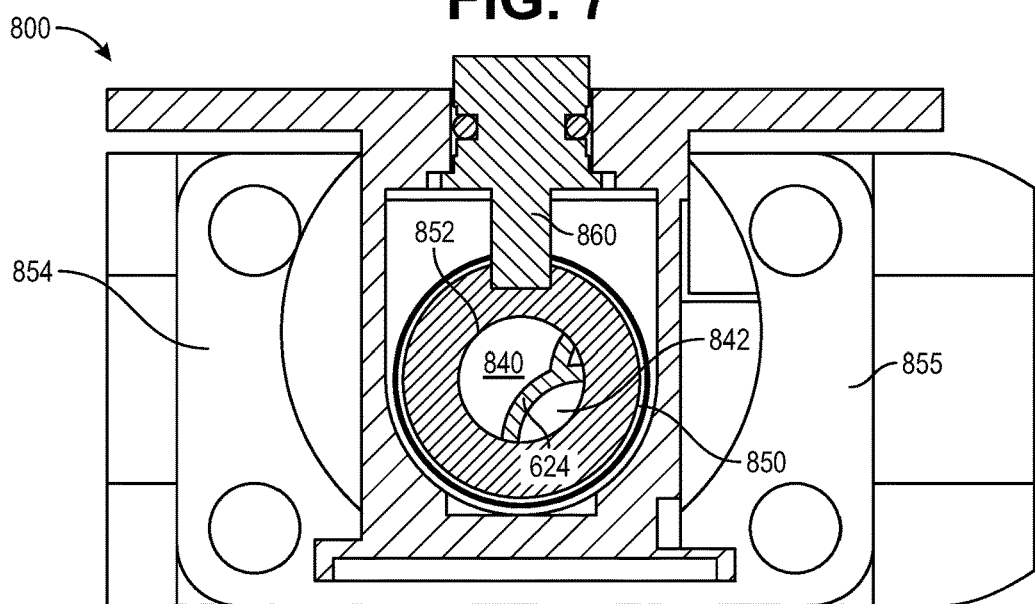
FIG. 8 illustrates an upstream view of a flow device having a ball valve with multiple flow passages in accordance with one embodiment.

FIG. 8 illustrates an upstream view (i.e., a side elevation view from the outlet end) of a flow device having a ball valve with multiple flow passages in accordance with one embodiment. The flow device 800 (e.g., CMU) includes a ball valve 850 having an opening 852. A liquid or fluid flows through opening 840 from a passage (e.g., high flow passage) into the opening 852. The liquid also flows through opening 842 from a passage (e.g., low flow passage) into the opening 852. A member 824 (or sidewall) divides the openings 840 and 842. The ball valve includes support members 854 and 855. An actuator 860 rotates or moves the ball valve 850 in order to adjust positions of the opening 852.

Figure 9:
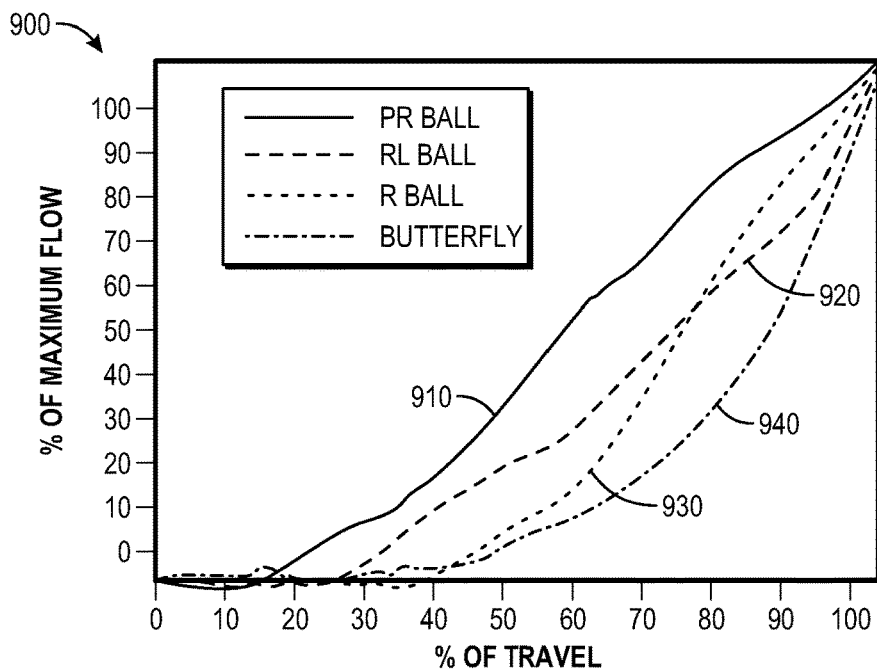
FIG. 9 illustrates a graph of maximum flow percentage versus percentage of travel for conventional valves.

Conventional valves or flow devices may have limited flow ranges and control issues. FIG. 9 illustrates a graph of maximum flow percentage versus percentage of travel for conventional valves. The graph 900 illustrates a non-linear flow performance of conventional devices such as valves 910, 920, 930, and 940. These valves have an operating range of approximately 10× in which a high flow rate limit is approximately 10× greater than a low flow rate limit.

Figure 10:
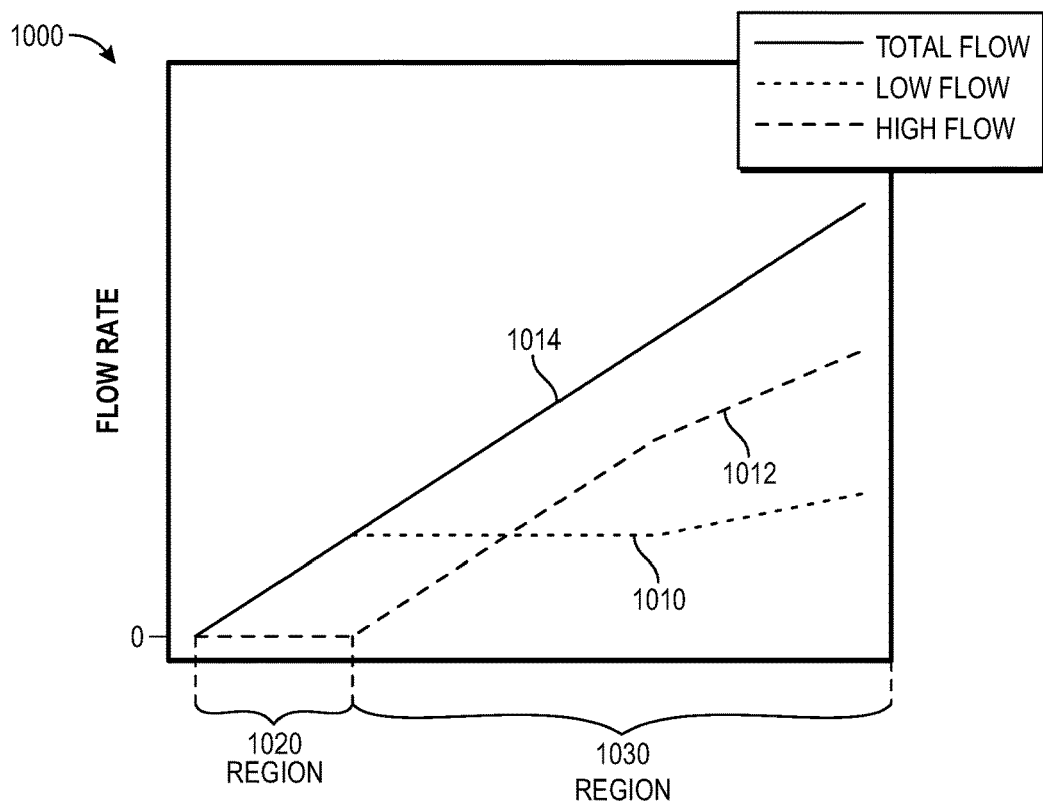
FIG. 10 illustrates a graph of flow rate versus operating regions for a flow device (e.g., CMU) have dual flow paths in accordance with one embodiment.

FIG. 10 illustrates a graph of flow rate versus operating regions for a flow device (e.g., CMU) have dual flow paths in accordance with one embodiment. The flow device (e.g., flow devices 220-227, 300, 500, 600, 800) includes dual flow paths of dual passages (e.g., 310, 320, 510, 520, 610, 620). A low flow passage has a flow 1010 of liquid in a region 1020 while a high flow passage does not have a flow 1012 of liquid in the region 1020. A ball valve (e.g., 350, 550, 650) transitions from a closed position to partially open during the region 1020. The ball valve transitions from a partially open position to a fully open position during the region 1030. A high flow 1012 starts to flow liquid upon the beginning of the region 1030 while the low flow 1010 increases slightly (if at all) during a first portion of the region 1030 and then increases slightly during a second portion of the region 1030. Upon combining the low flow 1010 and high flow 1012, a total flow 1014 has a linear response during an entire operating range that includes both regions 1020 and 1030. In one example, a high flow limit is 60× greater than a low flow limit. The low flow 1010 provides an accurately measured flow even for low flow rates and the high flow 1020 provides a large flow capacity.

Figure 11:
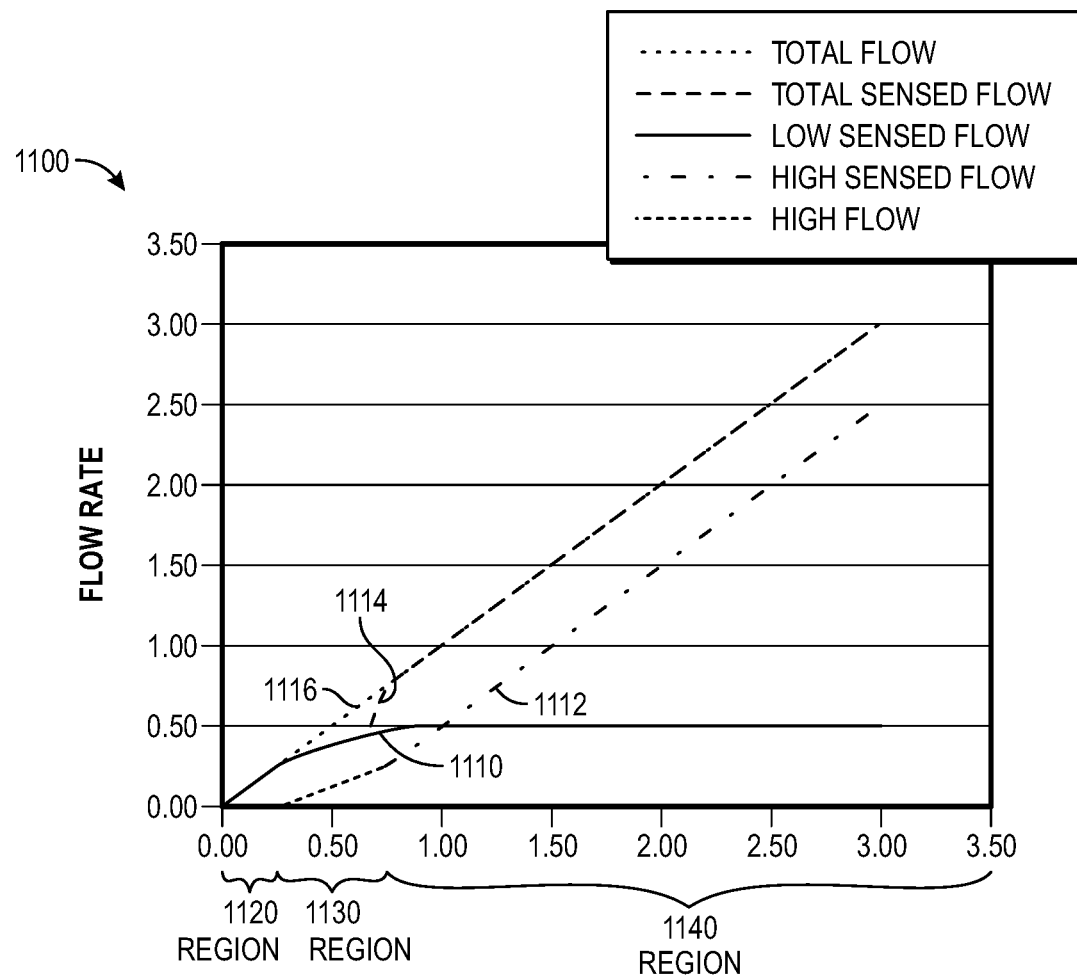
FIG. 11 illustrates a graph of flow rate versus operating regions for different operating regions of a flow device in accordance with one embodiment.

For different flow ranges, different measurements from the flow meters or estimates of flow can be used. FIG. 11 illustrates a graph of flow rate versus operating regions for different operating regions of a flow device in accordance with one embodiment. The flow device (e.g., flow devices 220-227, 300, 500, 600, 800) includes dual flow paths of dual passages (e.g., 310, 320, 510, 520, 610, 620). A low flow passage has a sensed flow 1110 of liquid in a region 1120 while a high flow passage does not have a sensed flow 1112 of liquid in the region 1120. A ball valve (e.g., 350, 550, 650) transitions from a closed position to partially open during the region 1120. The ball valve transitions from a partially open position to a more partially open position during the region 1130. A low flow passage continues with an increased sensed flow 1110 while the high sensed flow 1112 also starts to flow liquid upon the beginning of the region 1130. The flow rate of the high sensed flow 1112 may be difficult to measure during region 1130 so an estimate of the high sensed flow rate can be used for this region 1130. The estimate of an area of opening of a high flow passage for estimating the high flow rate is based on known relative areas of the low and high flow paths. A position sensor can be located on the ball valve in order to determine these relative areas of the low and high flow paths.

At region 1140, the low flow passage continues with an increased sensed flow 1110 and may saturate (e.g., at flow rate of 0.50) while the high sensed flow 1112 continues to increase a flow rate of liquid. The high sensed flow rate can be reliably sensed during the region 1140. Upon combining the low sensed flow 1110 and high sensed flow 1112, a total sensed flow 1114 has a linear response during an entire operating range and corresponds to a total flow 1116 that also has a linear response during an entire operating range. In one example, a flow meter for the low sensed flow 1110 can accurately measure a flow between approximately 0 and 0.5 gallons/minute and a flow meter for the high sensed flow 1112 can accurately measure a flow between 0.25 and 2.5 gallons/minute. In another example, a flow meter for the high sensed flow 1112 can accurately measure a flow between 0.75 and 2.5 gallons/minute.

Figure 12:
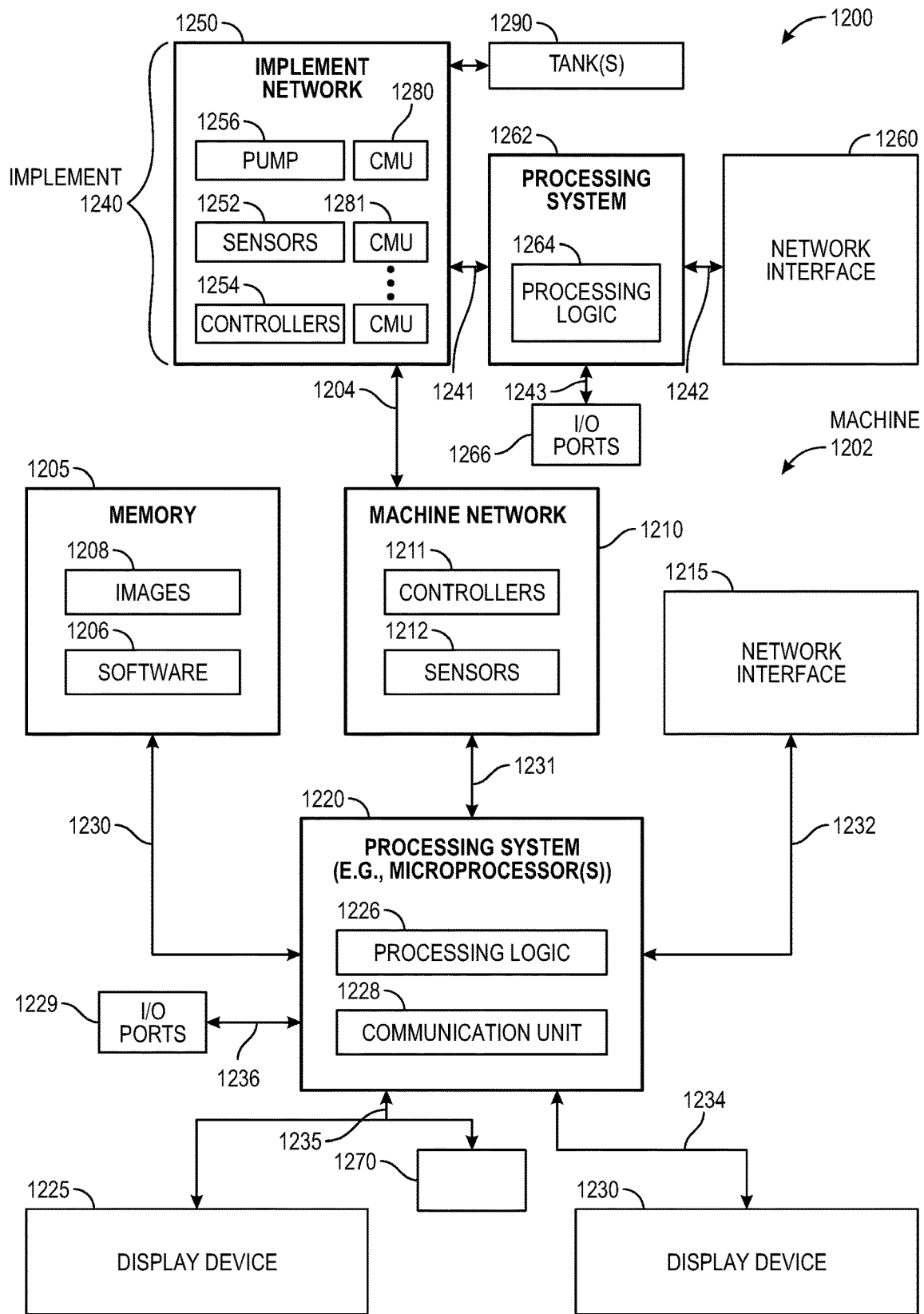
FIG. 12 shows an example of a system 1200 that includes a machine 1202 (e.g., tractor, combine harvester, etc.) and an implement 1240 (e.g., planter, cultivator, plough, sprayer, spreader, irrigation implement, etc.) in accordance with one embodiment.

FIG. 12 shows an example of a system 1200 that includes a machine 1202 (e.g., tractor, combine harvester, etc.) and an implement 1240 (e.g., planter, cultivator, plough, sprayer, spreader, irrigation implement, etc.) in accordance with one embodiment. The machine 1202 includes a processing system 1220, memory 1205, machine network 1210 (e.g., a controller area network (CAN) serial bus protocol network, an ISOBUS network, etc.), and a network interface 1215 for communicating with other systems or devices including the implement 1240. The machine network 1210 includes sensors 1212 (e.g., speed sensors), controllers 1211 (e.g., GPS receiver, radar unit) for controlling and monitoring operations of the machine or implement. The network interface 1215 can include at least one of a GPS transceiver, a WLAN transceiver (e.g., WiFi), an infrared transceiver, a Bluetooth transceiver, Ethernet, or other interfaces from communications with other devices and systems including the implement 1240. The network interface 1215 may be integrated with the machine network 1210 or separate from the machine network 1210 as illustrated in FIG. 12. The I/O ports 1229 (e.g., diagnostic/on board diagnostic (OBD) port) enable communication with another data processing system or device (e.g., display devices, sensors, etc.).

In one example, the machine performs operations of a tractor that is coupled to an implement for liquid applications of a field. The flow rate of a liquid application for each row unit of the implement can be associated with locational data at time of application to have a better understanding of the applied liquid for each row and region of a field. Data associated with the liquid applications can be displayed on at least one of the display devices 1225 and 1230.

The processing system 1220 may include one or more microprocessors, processors, a system on a chip (integrated circuit), or one or more microcontrollers. The processing system includes processing logic 1226 for executing software instructions of one or more programs and a communication unit 1228 (e.g., transmitter, transceiver) for transmitting and receiving communications from the machine via machine network 1210 or network interface 1215 or implement via implement network 1250 or network interface 1260. The communication unit 1228 may be integrated with the processing system or separate from the processing system. In one embodiment, the communication unit 1228 is in data communication with the machine network 1210 and implement network 1250 via a diagnostic/OBD port of the I/O ports 1229.

Processing logic 1226 including one or more processors may process the communications received from the communication unit 1228 including agricultural data (e.g., GPS data, liquid application data, flow rates, etc.). The system 1200 includes memory 1205 for storing data and programs for execution (software 1206) by the processing system. The memory 1205 can store, for example, software components such as liquid application software for analysis of liquid applications for performing operations of the present disclosure, or any other software application or module, images (e.g., captured images of crops), alerts, maps, etc. The memory 1205 can be any known form of a machine readable non-transitory storage medium, such as semiconductor memory (e.g., flash; SRAM; DRAM; etc.) or non-volatile memory, such as hard disks or solid-state drive. The system can also include an audio input/output subsystem (not shown) which may include a microphone and a speaker for, for example, receiving and sending voice commands or for user authentication or authorization (e.g., biometrics).

The processing system 1220 communicates bi-directionally with memory 1205, machine network 1210, network interface 1215, header 1280, display device 1230, display device 1225, and I/O ports 1229 via communication links 1230-1236, respectively.

Display devices 1225 and 1230 can provide visual user interfaces for a user or operator. The display devices may include display controllers. In one embodiment, the display device 1225 is a portable tablet device or computing device with a touchscreen that displays data (e.g., liquid application data, captured images, localized view map layer, high definition field maps of as-applied liquid application data, as-planted or as-harvested data or other agricultural variables or parameters, yield maps, alerts, etc.) and data generated by an agricultural data analysis software application and receives input from the user or operator for an exploded view of a region of a field, monitoring and controlling field operations. The operations may include configuration of the machine or implement, reporting of data, control of the machine or implement including sensors and controllers, and storage of the data generated. The display device 1230 may be a display (e.g., display provided by an original equipment manufacturer (OEM)) that displays images and data for a localized view map layer, as-applied liquid application data, as-planted or as-harvested data, yield data, controlling a machine (e.g., planter, tractor, combine, sprayer, etc.), steering the machine, and monitoring the machine or an implement (e.g., planter, combine, sprayer, etc.) that is connected to the machine with sensors and controllers located on the machine or implement.

A cab control module 1270 may include an additional control module for enabling or disabling certain components or devices of the machine or implement. For example, if the user or operator is not able to control the machine or implement using one or more of the display devices, then the cab control module may include switches to shut down or turn off components or devices of the machine or implement.

The implement 1240 (e.g., planter, cultivator, plough, sprayer, spreader, irrigation implement, etc.) includes an implement network 1250, a processing system 1262, a network interface 1260, and optional input/output ports 1266 for communicating with other systems or devices including the machine 1202. The implement network 1250 (e.g., a controller area network (CAN) serial bus protocol network, an ISOBUS network, etc.) includes a pump 1256 for pumping liquid from a storage tank(s) 1290 to CMUs 1280, 1281, . . . N of the implement, sensors 752 (e.g., speed sensors, seed sensors for detecting passage of seed, downforce sensors, actuator valves, OEM sensors, flow sensors, etc.), controllers 754 (e.g., GPS receiver), and the processing system 762 for controlling and monitoring operations of the machine. The CMUs control and monitor the application of the liquid to crops or soil as applied by the implement. The liquid application can be applied at any stage of crop development including within a planting trench upon planting of seeds, adjacent to a planting trench in a separate trench, or in a region that is nearby to the planting region (e.g., between rows of corn or soybeans) having seeds or crop growth.

The OEM sensors may be moisture sensors or flow sensors for a combine, speed sensors for the machine, seed force sensors for a planter, liquid application sensors for a sprayer, or vacuum, lift, lower sensors for an implement. For example, the controllers may include processors in communication with a plurality of seed sensors. The processors are configured to process data (e.g., liquid application data, seed sensor data) and transmit processed data to the processing system 1262 or 1220. The controllers and sensors may be used for monitoring motors and drives on a planter including a variable rate drive system for changing plant populations. The controllers and sensors may also provide swath control to shut off individual rows or sections of the planter. The sensors and controllers may sense changes in an electric motor that controls each row of a planter individually. These sensors and controllers may sense seed delivery speeds in a seed tube for each row of a planter.

In one example, sensors includes ion selective electrodes and IR spectroscopy for measuring different nutrients (e.g., nitrogen, phosphorus, potassium, etc.) of soil samples. A rate of liquid application can be changed dynamically in-situ in a region of a field during an agricultural operation by the control and monitoring units and flow devices disclosed herein based on a measured amount of soil nutrients (e.g., recently measured soil nutrients, dynamic real time measured amount of different nutrients) in the region of the field that is measured during the agricultural operation or has been previously measured for the particular region of the field. The sensors may also include soil conductivity, soil temperature, and optical sensors.

The network interface 1260 can be a GPS transceiver, a WLAN transceiver (e.g., WiFi), an infrared transceiver, a Bluetooth transceiver, Ethernet, or other interfaces from communications with other devices and systems including the machine 1202. The network interface 1260 may be integrated with the implement network 1250 or separate from the implement network 1250 as illustrated in FIG. 12.

The processing system 1262 communicates bi-directionally with the implement network 1250, network interface 1260, and I/O ports 1266 via communication links 1241-1243, respectively.

The implement communicates with the machine via wired and possibly also wireless bi-directional communications 1204. The implement network 1250 may communicate directly with the machine network 1210 or via the networks interfaces 1215 and 1260. The implement may also by physically coupled to the machine for agricultural operations (e.g., planting, harvesting, spraying, etc.).

The memory 1205 may be a machine-accessible non-transitory medium on which is stored one or more sets of instructions (e.g., software 1206) embodying any one or more of the methodologies or functions described herein. The software 1206 may also reside, completely or at least partially, within the memory 1205 and/or within the processing system 1220 during execution thereof by the system 1200, the memory and the processing system also constituting machine-accessible storage media. The software 1206 may further be transmitted or received over a network via the network interface 1215.

In one embodiment, a machine-accessible non-transitory medium (e.g., memory 1205) contains executable computer program instructions which when executed by a data processing system cause the system to performs operations or methods of the present disclosure including capturing images of different stages of crop development and performing analysis of the captured image data. While the machine-accessible non-transitory medium (e.g., memory 1205) is shown in an exemplary embodiment to be a single medium, the term "machine-accessible non-transitory medium" should be taken to include a single medium or multiple media (e.g., a centralized or distributed database, and/or associated caches and servers) that store the one or more sets of instructions. The term "machine-accessible non-transitory medium" shall also be taken to include any medium that is capable of storing, encoding or carrying a set of instructions for execution by the machine and that cause the machine to perform any one or more of the methodologies of the present disclosure. The term "machine-accessible non-transitory medium" shall accordingly be taken to include, but not be limited to, solid-state memories, optical and magnetic media, and carrier wave signals.

Figure 13:
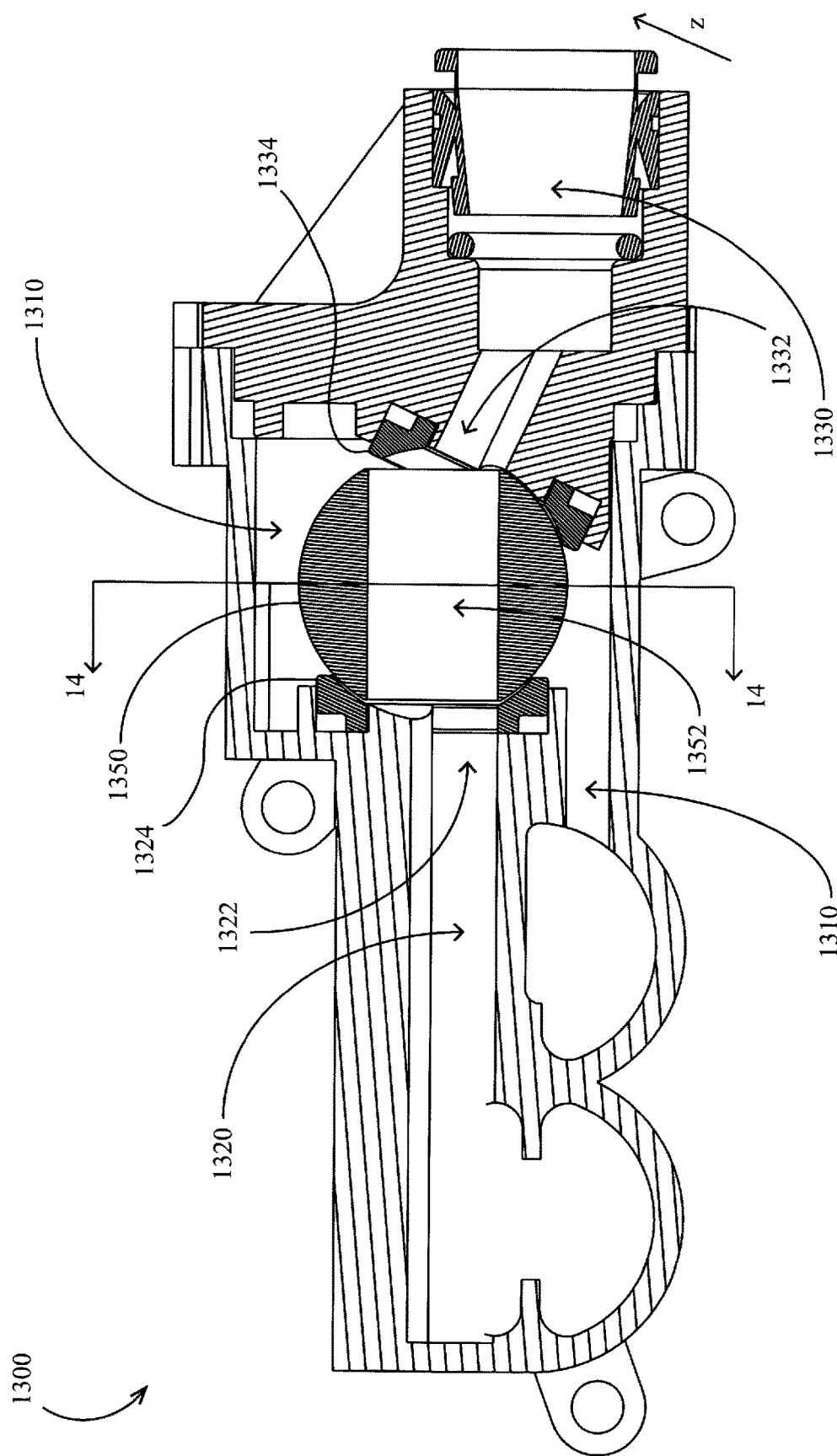
FIG. 13 shows an alternative example of a flow device in accordance with one embodiment.
Figure 14:
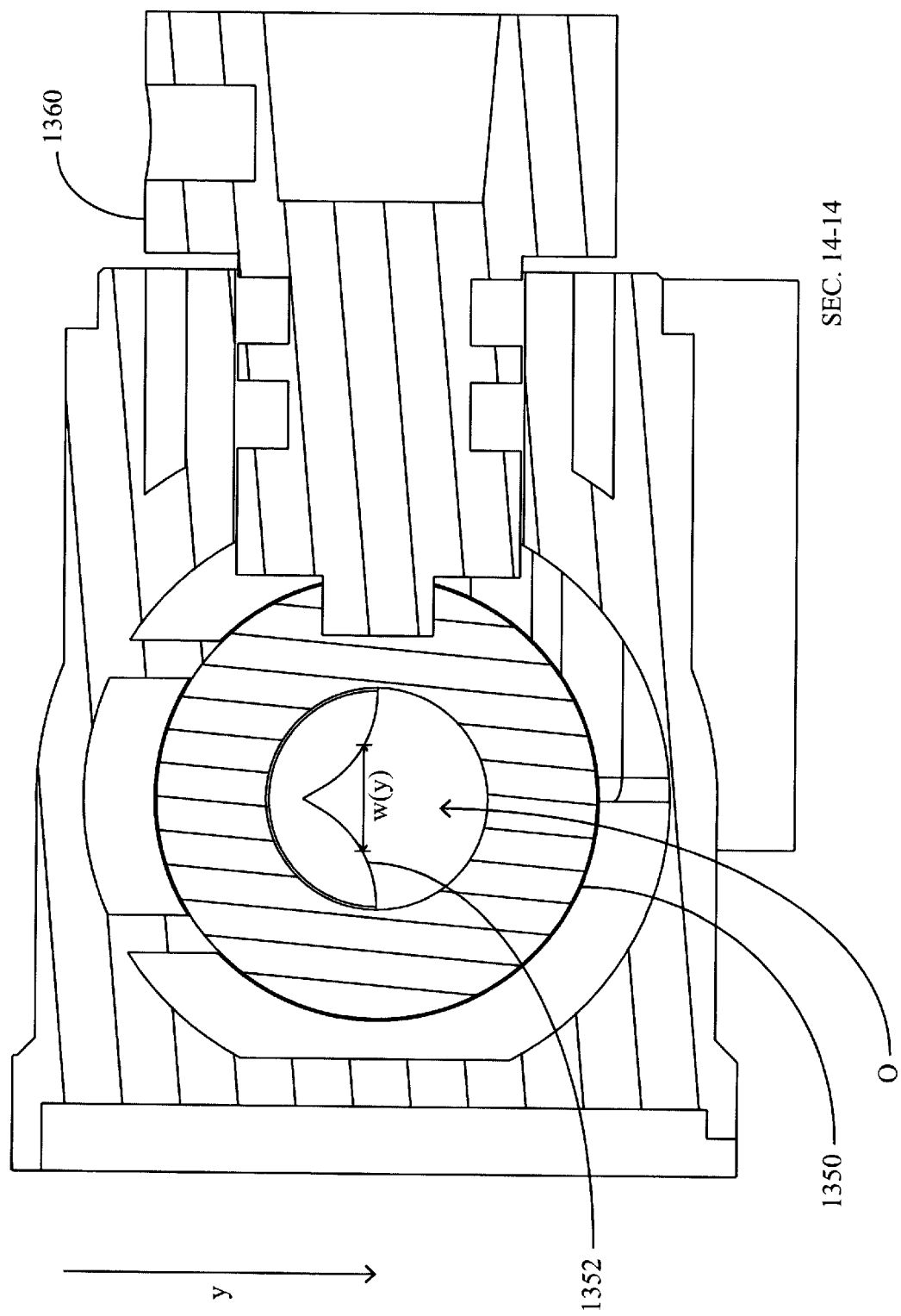
FIG. 14 shows a cross-sectional view of the flow device of FIG. 13 along the section 14-14 of FIG. 13 in accordance with one embodiment.

Turning to FIGS. 13 and 14, an alternative flow device 1300 is illustrated in accordance with one embodiment. The flow device 1300 preferably includes a low flow cavity 1310 (preferably in fluid communication with a low flow fluid source), a high flow passage 1320 (preferably in fluid communication with a high flow fluid source having a higher operating pressure than the low pressure fluid source), and an outlet passage 1330 (preferably in fluid communication with an dispensing device such as a flexible tube for directing fluid to a desired location such as a planting trench).

A ball valve 1350 is preferably disposed within the low flow cavity 1310. The ball valve 1350 preferably includes a ball valve opening 1352 (e.g., a cylindrical through-opening as illustrated). The ball valve 1350 is preferably retained in its translational position (but permitted to rotate as described herein) by spherical seals 1324, 1334. The ball valve is preferably coupled to an actuator 1360 (e.g., the output shaft of an electric motor in data communication with the implement network for receiving actuator position commands) as illustrated in FIG. 14. The actuator 1360 is preferably configured to rotate the ball valve through a rotational range of motion about an axis normal to a central axis of the ball valve opening 1352. The range of motion of the ball valve 1350 when rotated by the actuator 1360 preferably comprises up to a 360 degree range of clockwise and/or counterclockwise motion on the view of FIG. 13.

The position of the ball valve opening 1352 preferably determines the fractional portion of a high flow passage opening 1322 and/or an outlet passage opening 1332 that are open to permit flow from the high flow passage 1320 to the ball valve opening 1352 and/or from the ball valve opening 1352 into the outlet passage 1330, respectively. The openings are preferably shaped such that the opened fractional portion of each opening increases (e.g., arithmetically, geometrically, exponentially, logarithmically) as the ball valve opening 1352 turns (e.g., counterclockwise on the view of FIG. 13) past each opening. For example, referring to FIG. 14, the ball valve opening 1352 may have a variable width W(y) which increases (e.g., arithmetically, geometrically, exponentially, logarithmically) along the direction y. Thus at positions of the ball valve which expose a vertical length y of the ball valve opening 1352, the area of the opened portion O of the ball valve opening 1352 is directly related to the width W(y). In the illustrated embodiment, the width W(y) preferably increases exponentially along the direction y due to the arcuate (e.g., outwardly-curved) sides of the ball valve opening 1352. The outlet passage opening 1332 is preferably configured similarly to the high flow passage opening 1322 except that the width of the outlet passage opening preferably increases along the direction z indicated in FIG. 13.

Referring again to FIG. 13, in a first partial range of motion of the ball valve 1350 (including, e.g., a position in which the ball valve opening 1352 extends vertically on the view of FIG. 13) neither the low flow cavity 1310 nor the high flow passage 1320 are in fluid communication; thus fluid preferably does not flow to the outlet passage 1330 in the first partial range of motion.

In a second partial range of motion of the ball valve 1350 only the low flow cavity 1310 is in fluid communication with the outlet passage 1330. As an increasing portion of the outlet passage opening 1332 is opened to the ball valve opening 1352 (e.g., a right side thereof along the view of FIG. 13) in the second partial range of motion, an increasing rate of flow is permitted from the low flow cavity 1310 to the outlet passage 1330 through the ball valve opening 1352.

In a third partial range of motion of the ball valve 1350 (including, e.g., the position illustrated in FIG. 13), both the low flow cavity 1310 and the high flow passage 1320 are in fluid communication with the outlet passage 1330. As an increasing portion of the outlet passage opening 1332 is opened to the ball valve opening 1352 (e.g., a right side thereof on the view of FIG. 13) in the second partial range of motion, an increasing rate of flow is permitted from the low flow cavity 1310 to the outlet passage 1330 through the ball valve opening 1352. As an increasing portion of the high flow passage opening 1322 is opened to the ball valve opening (e.g., a left side thereof on the view of FIG. 13) in the second partial range of motion, an increasing rate of flow is permitted from the high flow passage 1320 to the outlet passage 1330 through the ball valve opening 1352.

In a fourth partial range of motion of the ball valve 1350, only the high flow passage is in fluid communication with the outlet passage 1330. As an increasing portion of the high flow passage opening 1322 is opened to the ball valve opening (e.g., a left side thereof on the view of FIG. 13) in the second partial range of motion, an increasing rate of flow is permitted from the high flow passage 1320 to the outlet passage 1330 through the ball valve opening 1352.

In operation, the ball valve 1350 preferably turns continuously (counterclockwise on the view of FIG. 13) through the first, second, third and fourth partial ranges of motion consecutively. The ball valve may then continue to turn in the same direction back into the first partial range of motion or may change direction and turn continuously (clockwise on the view of FIG. 13) through the fourth, third, second and first partial ranges of motion.

Figure 15:
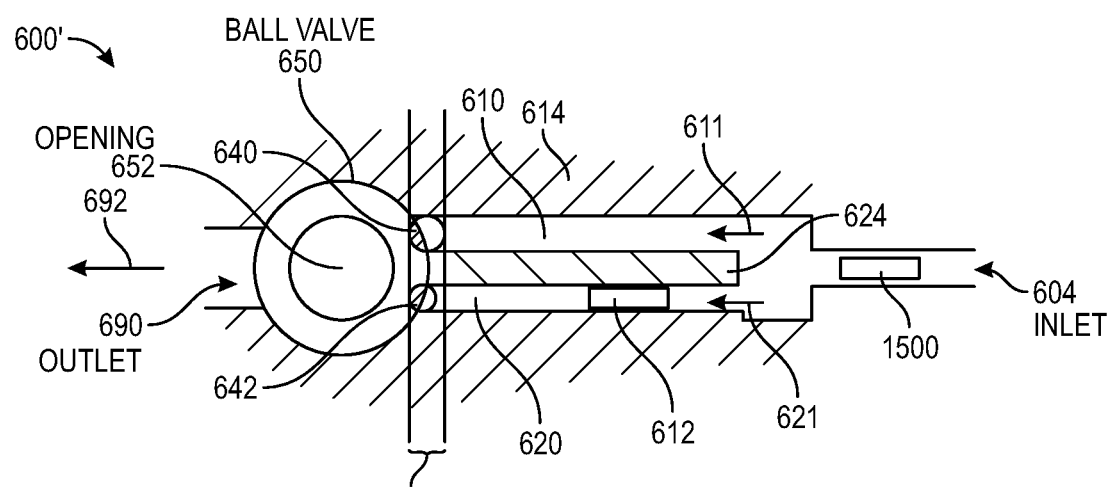
FIG. 15 illustrates a flow device (e.g., control and monitoring unit) for controlling and monitoring applications in a field in accordance with another embodiment.
Figure 16:
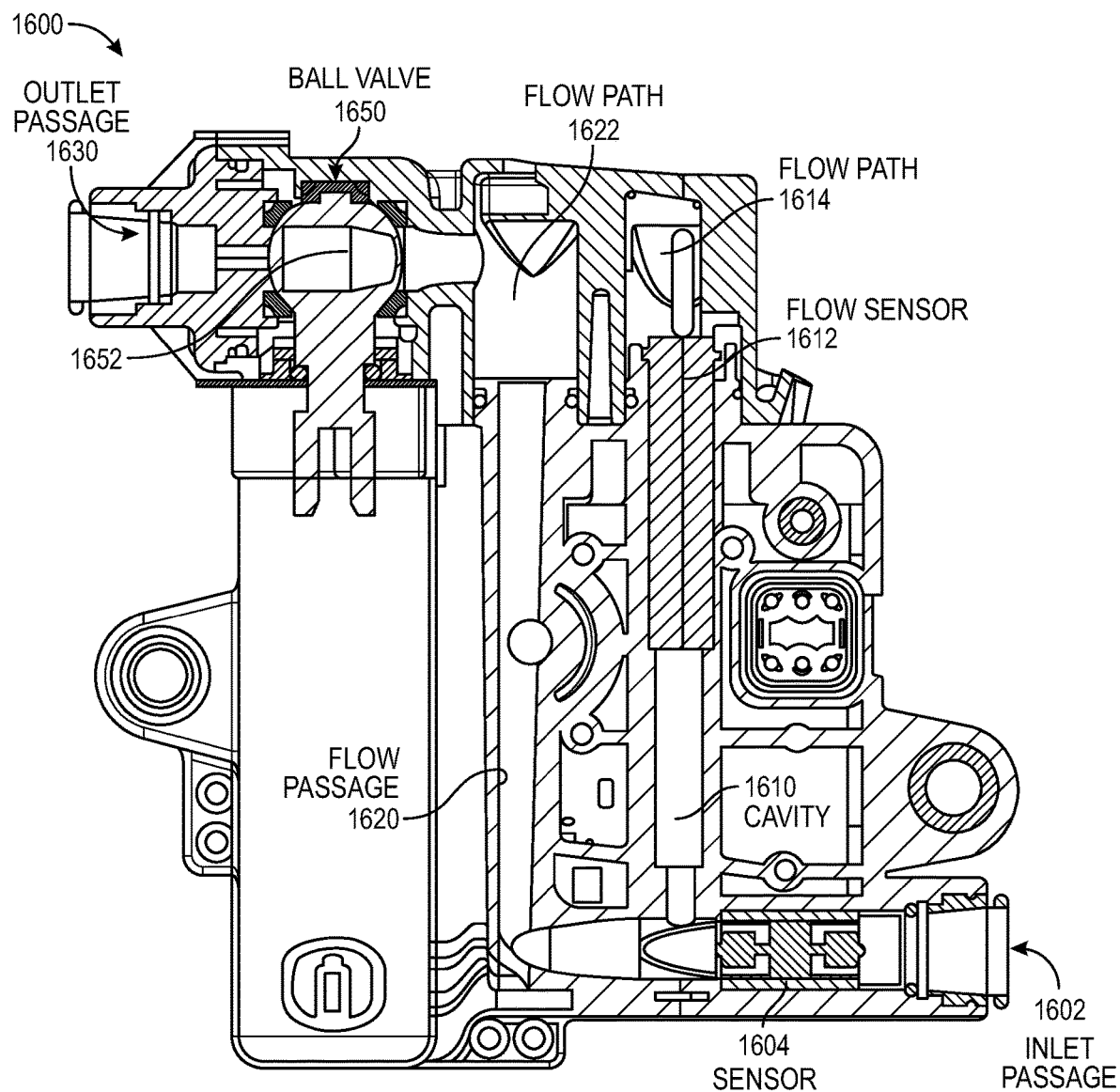
FIGS. 16-20 illustrate examples of flow devices in accordance with one embodiment.

FIG. 15 illustrates a flow device (e.g., control and monitoring unit) for controlling and monitoring applications in a field in accordance with another embodiment. Referring to FIG. 15, a flow device 600' is preferably similar to the flow device 600 described herein, except that instead of (or, alternatively, in addition to) a flow meter disposed in the high flow passage 610, a flow meter 1500 is disposed in the inlet 604 in order to measure the total flow entering the flow device 600'. In operation of the flow device 600', at a first range of flow rates (e.g., low flow rates) the high flow passage 610 is preferably closed to flow and the low flow meter 612 is preferably used to determine the total flow rate through the flow device 600'. At a second range of flow rates (e.g., flow rates greater than the first range), either the low flow meter 612 or the total flow meter 1500 is used to determine the total flow rate through the flow device. At a third range of flow rates (e.g., flow rates greater than the second range), the total flow meter 1500 is preferably used to determine the total flow rate through the flow device.

The low flow meter 612 is preferably configured to measure flow accurately (e.g., within 0.01, 0.05, 0.1, 0.2, 0.5, 1, 2 or 5% error) in the first range of flow rates and at least a lower portion of the second range of flow rates. The total flow meter 1500 is preferably configured to measure flow accurately (e.g., within 0.01, 0.05, 0.1, 0.2, 0.5, 1, 2 or 5% error) in the third range of flow rates and at least an upper portion of the second range of flow rates. The upper portion and lower portion preferably overlap such that the range of flow rates accurately measurable by the low flow meter 612 preferably overlaps with the range of flow rates accurately measurable by the total flow meter 1500. A flow meter is an instrument for measuring linear, nonlinear, mass, or volumetric flow of a liquid or gas.

Turning to FIGS. 16-20, another flow device 1600 is illustrated in accordance with one embodiment. The flow device 1600 preferably includes an inlet passage 1602, a total flow sensor 1604 to measure a total flow through the inlet passage, a low flow cavity 1610 (preferably in fluid communication with a low pressure fluid source), a low flow sensor 1612 to measure a flow through the low flow cavity, a low flow path 1614, a high flow passage 1620 (preferably in fluid communication with a high pressure fluid source having a higher operating pressure than the low pressure fluid source), a high flow path 1622, and an outlet passage 1630 (preferably in fluid communication with an dispensing device such as a flexible tube for directing fluid to a desired location such as a planting trench). In one example, the high flow passage is capable of flow rates that are up to 60 times greater than flow rates of the low flow passage.

A ball valve 1650 (e.g., an offset ball valve) is preferably capable of receiving liquid flow from low and high flow paths and providing liquid flow to the outlet passage 1630. The ball valve 1650 preferably includes a ball valve opening 1652 (e.g., multiple cylindrical through-openings as illustrated). The ball valve 1650 is preferably retained in its translational position (but permitted to rotate as described herein) by seals. The ball valve may be coupled to an actuator (e.g., the output shaft of an electric motor in data communication with the implement network for receiving actuator position commands). The actuator is preferably configured to rotate the ball valve through a rotational range of motion about an axis normal to a central axis of the ball valve opening 1652. The range of motion of the ball valve 1650 when rotated by the actuator preferably comprises up to a 360 degree range of clockwise and/or counter-clockwise motion on the view of FIG. 16.

The position of the ball valve opening 1652 preferably determines a flow of liquid from high and low flow paths through the ball valve opening to the outlet passage 1630. The openings of the flow paths are preferably shaped such that the opened fractional portion of each opening increases or decreases (e.g., arithmetically, geometrically, exponentially, logarithmically) as a ball valve opening 1652 turns (e.g., counterclockwise on the views of FIGS. 17-20) past each opening of the flow paths.

Figure 17:
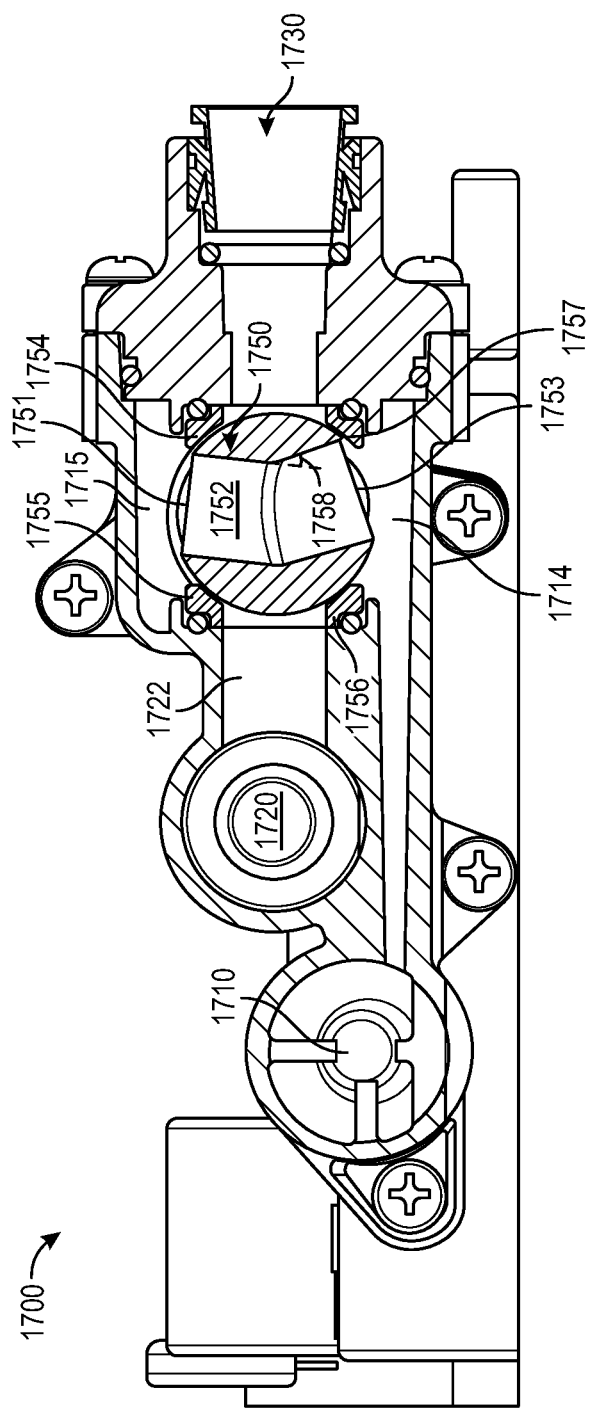

Referring to a flow device 1700 of FIG. 17, in a first partial range of motion of the ball valve 1750 (including, e.g., a closed position in which the ball valve opening 1752 with multiple cylindrical openings 1751 and 1753 extends substantially vertically on the view of FIG. 17) neither the low flow cavity 1710 and low flow paths 1714, 1715 nor the high flow passage 1720 and high flow path 1722 are in fluid communication with the outlet passage 1730; thus fluid preferably does not flow to the outlet passage 1730 in the first partial range of motion. The flow device 1700 includes seals 1754-1757 for rotating the opening 1752 in the ball valve 1750. The ball valve opening 1752 includes multiple openings 1751 and 1753 each having a cylindrical shaped bore. The openings 1751 and 1753 are positioned in relation to each other with a configurable angle 1758 other than 180 degrees (e.g., 10-40 degrees or 20-30 degrees) that can be predetermined or adjustable in accordance with one embodiment.

Figure 18:
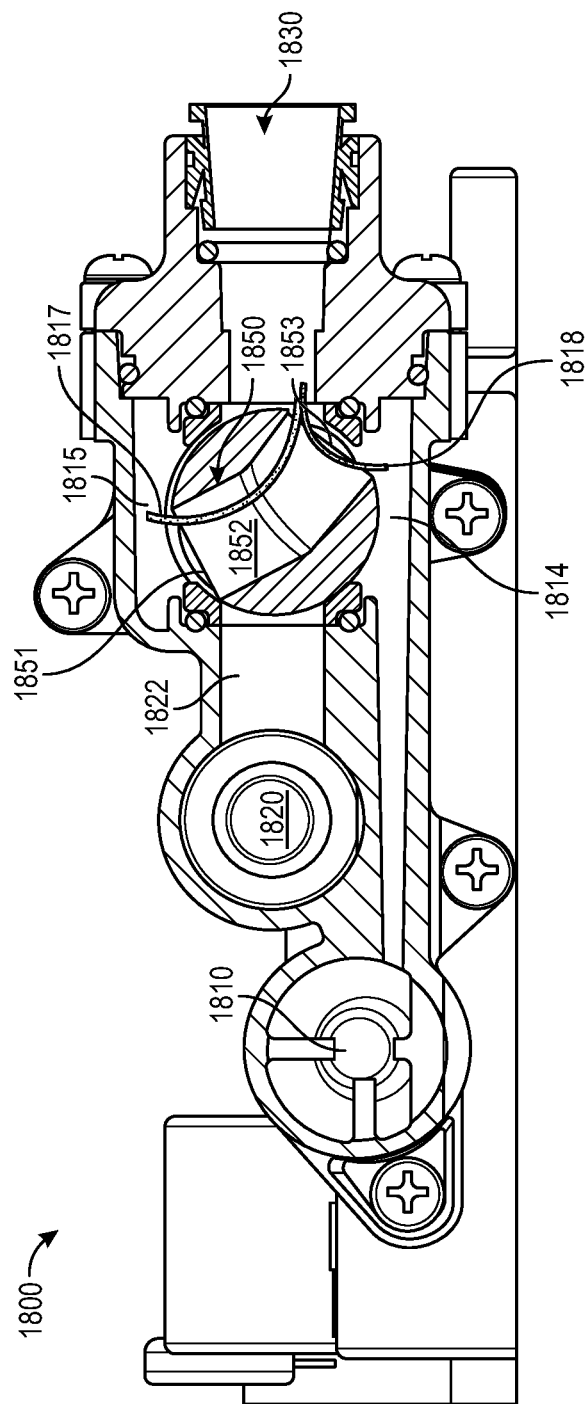

Referring to a flow device 1800 of FIG. 18, in a second partial range of motion of the ball valve 1850 only the low flow cavity 1810 and low flow paths 1814, 1815 are in fluid communication with the outlet passage 1830. Specifically, low flow paths 1817 and 1818 pass through the ball valve opening 1852 into the outlet passage 1830. As an increasing portion of an opening of the outlet passage 1830 is opened to the ball valve opening 1852 in the second partial range of motion, an increasing rate of flow is permitted from the low flow cavity 1810 and low flow paths 1814 and 1815 to the outlet passage 1830 using the paths 1817 and 1818 through the ball valve opening 1852.

Figure 19:
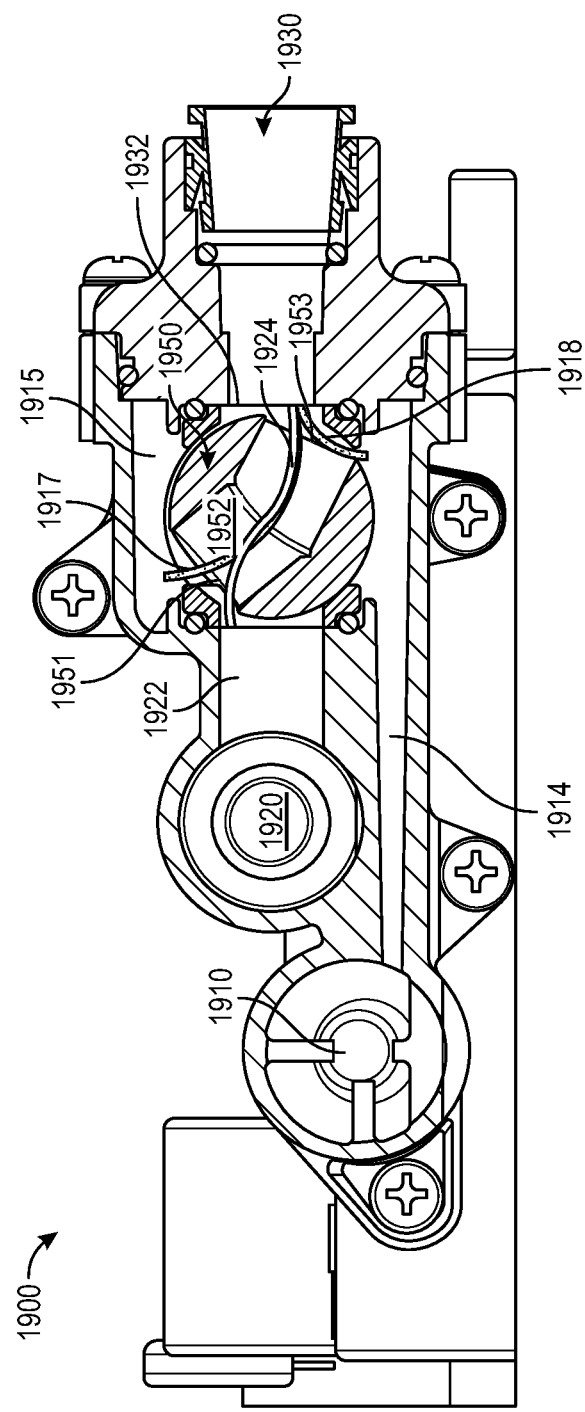

In a third partial range of motion of the ball valve 1950 (including, e.g., the position illustrated in a flow device 1900 of FIG. 19), both the low flow cavity 1910 and the high flow passage 1920 are in fluid communication with the outlet passage 1930. As an increasing portion of an outlet passage opening 1932 is opened to the ball valve opening 1952 in the third partial range of motion, an increasing rate of flow is permitted from the low flow cavity 1910, low flow path 1914, and low flow path 1915 to the outlet passage 1930 through the low flow paths 1917 and 1918 that pass through openings 1951 and 1953 of the ball valve opening 1952 into the opening 1932.

As an increasing portion of an outlet passage opening 1932 is opened to the ball valve opening 1952 in the third partial range of motion, an increasing rate of flow is permitted from the high flow cavity 1920 and high flow path 1922 to the outlet passage 1930 through the high flow path 1924 that passes through openings 1951 and 1953 of the ball valve opening 1952 into the opening 1932.

Figure 20:
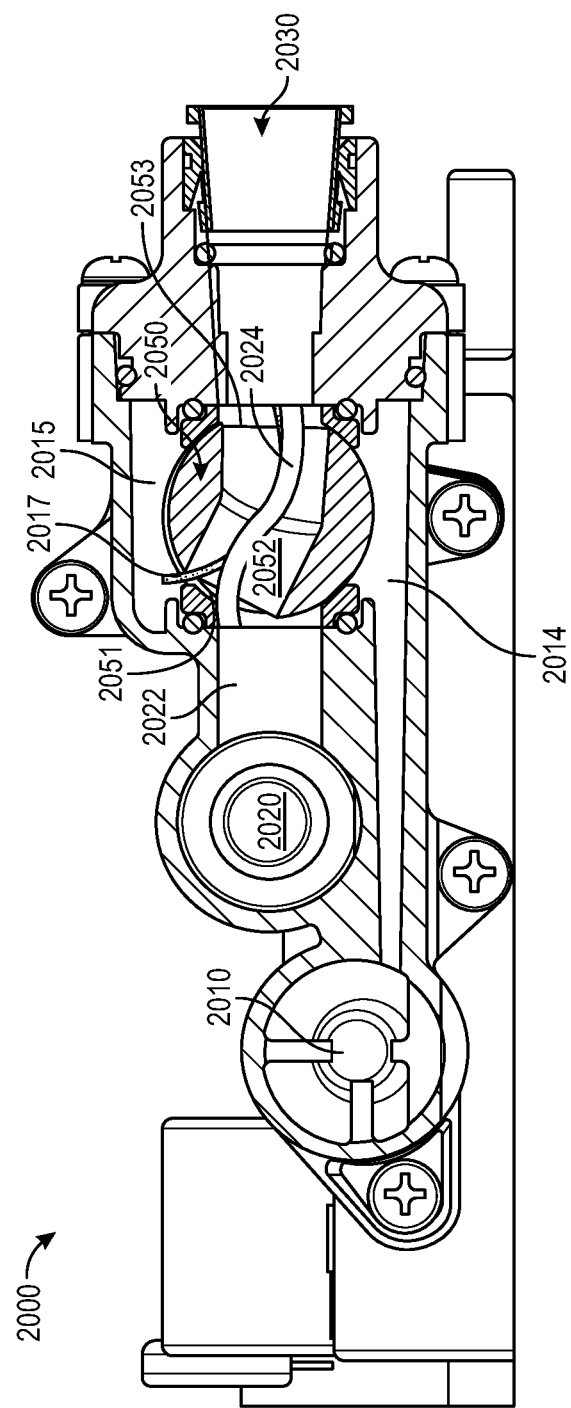

In a fourth partial range of motion of the ball valve 2050 as illustrated in a flow device 2000 of FIG. 20, only low flow paths 2015 and 2017 and the high flow passage 2020, high flow path 2022, and high flow path 2024 are in fluid communication with the outlet passage 3030. As an increasing portion of the high flow passage 2020 and high flow path 2022 is opened to the ball valve opening in the fourth partial range of motion, an increasing rate of flow is permitted from the high flow passage 2020 to the outlet passage 2030 through openings 2051 and 2053 of the ball valve opening 2052. The low flow path 2014 is not in fluid communication with the ball valve opening 2052 and the outlet passage 2030.

In operation, the ball valve (e.g., 1650, 1750, 1850, 1950, 2050) preferably turns continuously (counterclockwise for the views of FIGS. 17-20) through the first, second, third and fourth partial ranges of motion consecutively. The ball valve may then continue to turn in the same direction back into the first partial range of motion or may change direction and turn continuously through the fourth, third, second and first partial ranges of motion.

Figure 21:
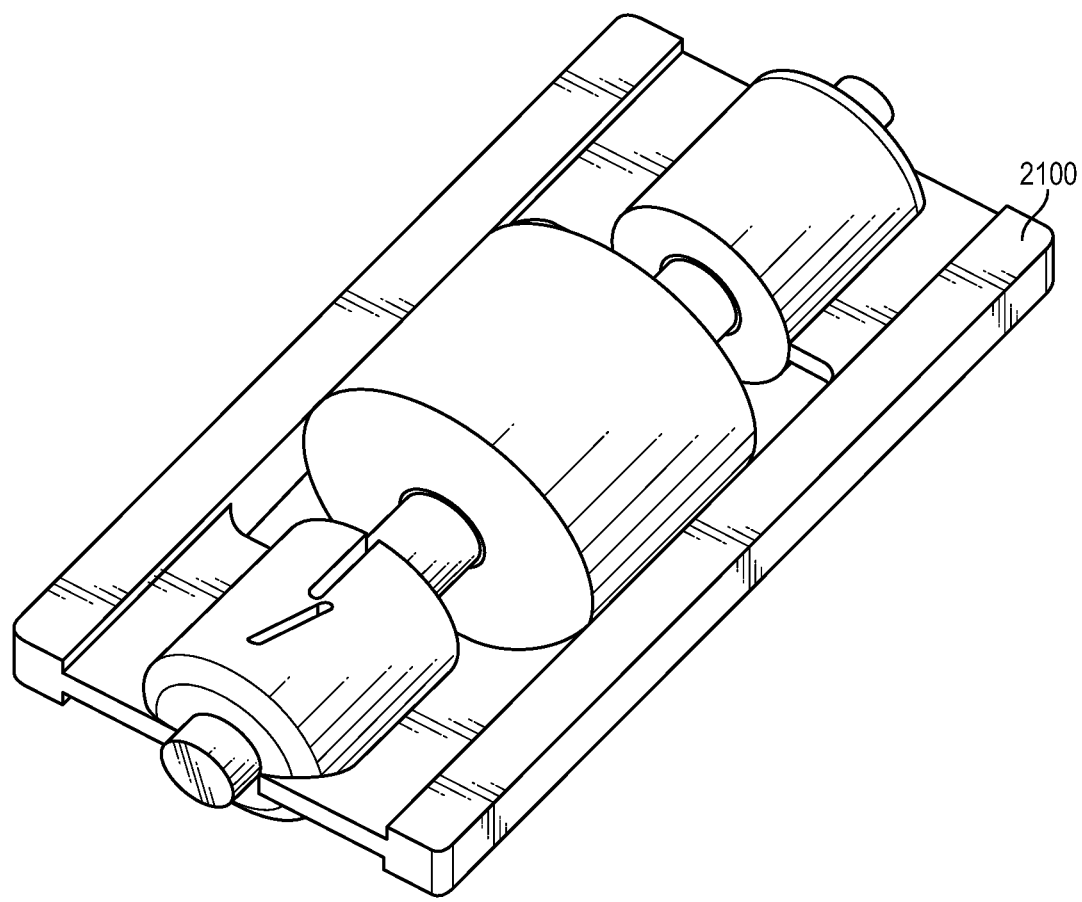
FIG. 21 illustrates a flow meter with a turbine insert in accordance with one embodiment.

FIG. 21 illustrates a flow meter with a turbine insert in accordance with one embodiment. The turbine insert 2100 rotates as liquid flows through a flow meter (e.g., 312, 322, 512, 528, 612, 628, 1500, flow sensor 1612, etc.).

Figure 22:
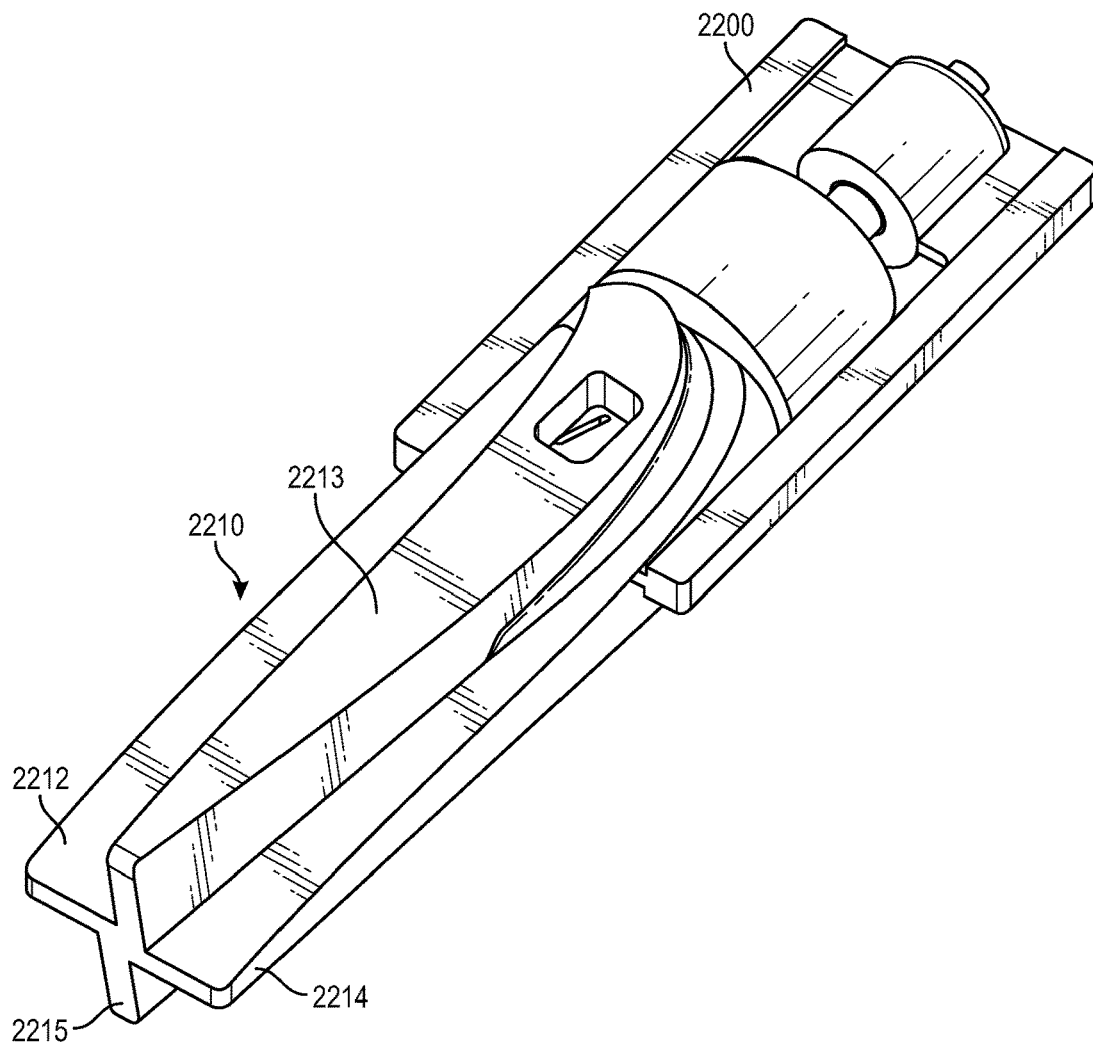
FIG. 22 illustrates a flow meter with a turbine insert that is coupled to a helix component in accordance with an alternative embodiment.

FIG. 22 illustrates a flow meter with a turbine insert that is coupled to a helix component in accordance with alternative embodiment. The turbine insert 2200 and helix component 2210 both rotate as liquid flows through a flow meter (e.g., 312, 322, 512, 528, 612, 628, 1500, flow sensor 1612, flow sensor 1604, etc.). The helix component 2210 includes ridges or veins 2212-2215 to obtain a faster velocity and faster spinning of the turbine insert in comparison to a turbine insert that does not include the helix component.

Figure 23:
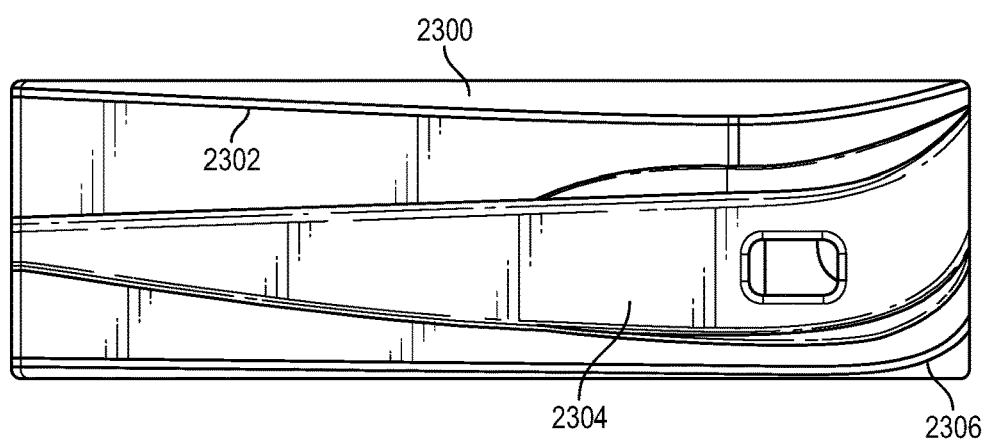
FIG. 23 illustrates a helix component in accordance with the alternative embodiment.

FIG. 23 illustrates a helix component in accordance with the alternative embodiment. The helix component 2300 includes ridges or veins 2302, 2304, and 2306 to obtain a faster velocity and faster spinning of an associated turbine insert in comparison to a turbine insert that does not include the helix component.

In a first embodiment, a flow device for controlling flow during an agricultural operation comprises an offset ball valve having multiple openings that rotate in position to control flow of a liquid through the offset ball valve to an outlet passage. A first passage provides a first flow path from an inlet to at least one opening of the offset ball valve. A second passage provides a second flow path from the inlet to at least one opening of the offset ball valve.

In one example of the first embodiment, the first embodiment optionally further includes the multiple openings of the offset ball valve each comprising a cylindrical shaped bore that are positioned in relation to each other with a configurable angle other than 180 degrees.

In another example of the first embodiment, the first embodiment optionally further includes the configurable angle being 10 to 40 degrees.

In another example of the first embodiment, the first embodiment optionally further includes the configurable angle being 20 to 30 degrees.

In another example of the first embodiment, the subject matter of any of the examples of the first embodiment optionally further includes the offset ball valve including a plurality of partial ranges of motion with each range of motion corresponding to a position of the offset ball valve including a first position in which the first passage and the second passage are not in fluid communication with the outlet passage.

In another example of the first embodiment, the subject matter of any of the examples of the first embodiment optionally further includes the offset ball valve including a second position in which the first passage includes a first flow path through a first opening of the offset ball valve to the outlet passage and a second flow path through a second opening of the offset ball valve.

In another example of the first embodiment, the subject matter of any of the examples of the first embodiment optionally further includes the offset ball valve including a third position in which the second passage includes a flow path at a first flow rate through the first and second openings of the offset ball valve to the outlet passage.

In another example of the first embodiment, the subject matter of any of the examples of the first embodiment optionally further includes the offset ball valve including a fourth position in which the first passage includes the first flow path at a first flow rate through a first opening of the offset ball valve to the outlet passage and the second passage includes a second flow path at a second flow rate through the first opening and a second opening of the offset ball valve to the outlet passage.

In another example of the first embodiment, the subject matter of any of the examples of the first embodiment optionally further includes in operation, the offset ball valve preferably rotating through different partial ranges of motion and corresponding different positions consecutively.

In another example of the first embodiment, the subject matter of any of the examples of the first embodiment optionally further includes the offset ball valve rotating to change a flow rate through the offset ball valve and the outlet passage based on receiving soil nutrient data from sensors with the soil nutrient data indicating a measured value of nutrients in soil of a field during the agricultural operation.

In a second embodiment, a control and monitoring unit comprises a valve having an opening for controlling flow of a liquid through the valve to an outlet and a first passage to provide a first flow path having a variable first flow rate from an inlet to the valve. The first passage includes a first flow meter to monitor flow of the liquid through the first passage. A second passage provides a second flow path having a variable second flow rate from the inlet to the valve. The second passage includes a second flow meter to monitor flow of the liquid through the second passage.

In one example of the second embodiment, the second embodiment optionally further includes a biasing mechanism that is coupled to the second passage and a member coupled to the biasing mechanism. The biasing mechanism opens when pressure on a first surface of the member exceeds pressure on a second surface of the member and this causes the liquid to flow through the second passage into the valve.

In another example of the second embodiment, the second embodiment optionally further includes the biasing mechanism that provides a functionality in keeping the second flow path through the second passage closed until a flow rate has reached a certain range such that measurements of the second flow meter are accurate.

In another example of the second embodiment, the subject matter of any of the examples of the second embodiment optionally further includes the first and second cross-sectional openings between the first and second passages and the ball valve varying as the ball valve rotates or moves from a closed position to an open position causing an increase in available cross-sectional area of the first and second cross-sectional openings through the ball valve.

In another example of the second embodiment, the subject matter of any of the examples of the second embodiment optionally further includes the first cross-sectional opening having a gradually widening shape with the cross-sectional area that is smaller than the cross-sectional area of the second cross-sectional opening.

In another example of the second embodiment, the subject matter of any of the examples of the second embodiment optionally further includes a wide range of motion of the ball valve corresponding to a gradually increasing rate of flow in the variable first flow rate.

In another example of the second embodiment, the subject matter of any of the examples of the second embodiment optionally further includes the second cross-sectional opening being wider than the first cross-sectional opening and having a generally constant width.

In a third embodiment, an implement comprises at least one tank for storing a liquid to be applied to a field, a plurality of row units each having a flow device that includes an offset ball valve having multiple openings that rotate in position to control flow of a liquid through the offset ball valve to an outlet passage for an application of the liquid to the field, and a pump coupled to the plurality of row units. The pump controls a flow of the liquid to the plurality of flow devices.

In one example of the third embodiment, the third embodiment further optionally includes each flow device including a first passage to provide a first flow path from an inlet to at least one opening of the offset ball valve and a second passage to provide a second flow path from the inlet to at least one opening of the offset ball valve.

In another example of the third embodiment, the subject matter of any of the examples of the third embodiment optionally further includes the multiple openings of the offset ball valve each comprising a cylindrical shaped bore that are positioned in relation to each other with a configurable angle other than 180 degrees.

In another example of the third embodiment, the subject matter of any of the examples of the third embodiment optionally further includes the configurable angle being 10 to 40 degrees.

In another example of the third embodiment, the subject matter of any of the examples of the third embodiment optionally further includes the configurable angle being 20 to 30 degrees.

In another example of the third embodiment, the subject matter of any of the examples of the third embodiment optionally further includes the offset ball valve including a plurality of partial ranges of motion with each range of motion corresponding to a position of the offset ball valve including a first position in which the first passage and the second passage are not in fluid communication with the outlet passage.

In another example of the third embodiment, the subject matter of any of the examples of the third embodiment optionally further includes in operation, the offset ball valve preferably rotating through different partial ranges of motion and corresponding different positions consecutively.

In another example of the third embodiment, the subject matter of any of the examples of the third embodiment optionally further includes an additional pump coupled to an additional plurality of row units. The additional pump controls a flow of the liquid to flow devices of the additional plurality of row units.

In another example of the third embodiment, the subject matter of any of the examples of the third embodiment optionally further includes at least one soil sensor to sense soil nutrient data indicating a measured value of nutrients in soil of a field during an agricultural operation. At least one offset ball valve rotates to change a flow rate through the offset ball valve and the outlet passage in response to receiving the soil nutrient data from the at least one sensor.

It is to be understood that the above description is intended to be illustrative, and not restrictive. Many other embodiments will be apparent to those of skill in the art upon reading and understanding the above description. The scope of the disclosure should, therefore, be determined with reference to the appended claims, along with the full scope of equivalents to which such claims are entitled.

What is claimed is:

1. A flow device for controlling flow during an agricultural operation, comprising:
   an inlet;
   an outlet passage;
   an offset ball valve having multiple openings that are offset relative to each other and rotate in position to control flow of a liquid through the offset ball valve to the outlet passage during the agricultural operation;
   a first passage to provide a first flow path from the inlet to enter a first opening of the offset ball valve to the outlet passage;
   a second passage to provide a second flow path from the inlet to enter the first opening of the offset ball valve to the outlet passage; and
   wherein the first flow path and the second flow path merge together flowing through the offset ball valve and exiting a second opening of the offset ball valve after separately entering the first opening of the offset ball valve for one of multiple positions of the offset ball valve.

2. The flow device of claim 1, wherein the multiple openings of the offset ball valve each comprise a cylindrical shaped bore that are positioned in relation to each other with a configurable angle other than 180 degrees.

3. The flow device of claim 2, wherein the configurable angle is 10 to 40 degrees.

4. The flow device of claim 2, wherein the configurable angle is 20 to 30 degrees.

5. The flow device of claim 1, wherein the offset ball valve includes a plurality of partial ranges of motion with each range of motion corresponding to a position of the multiple positions of the offset ball valve comprising:
   a first position in which the first passage and the second passage are not in fluid communication with the outlet passage;
   a second position in which the first passage includes the first flow path through the first opening of the offset ball valve to the outlet passage and the second flow path through a second opening of the offset ball valve;
   a third position in which the second passage includes the first flow path at a first flow rate through the first and the second openings of the offset ball valve to the outlet passage; and
   a fourth position in which the first passage includes the first flow path at the first flow rate through the first opening of the offset ball valve to the outlet passage and the second passage includes the second flow path at a second flow rate through the first opening and the second opening of the offset ball valve to the outlet passage.

6. The flow device of claim 5, wherein in operation, the offset ball valve rotates through different partial ranges of motion and corresponding different positions consecutively.

7. The flow device of claim 1, wherein the offset ball valve rotates to change a flow rate through the offset ball valve and the outlet passage based on receiving soil nutrient data from sensors with the soil nutrient data indicating a measured value of nutrients in soil of a field during the agricultural operation.

* * * * *